US007240355B1

(12) United States Patent
Eldering et al.

(10) Patent No.: US 7,240,355 B1
(45) Date of Patent: *Jul. 3, 2007

(54) SUBSCRIBER CHARACTERIZATION SYSTEM WITH FILTERS

(75) Inventors: Charles A. Eldering, Doylestown, PA (US); M. Lamine Sylla, New Britain, PA (US); John P. Blasko, New Hope, PA (US)

(73) Assignee: Prime Research Alliance E., Inc., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 09/516,983

(22) Filed: Mar. 1, 2000

Related U.S. Application Data

(63) Continuation-in-part of application No. 09/204,888, filed on Dec. 3, 1998, now Pat. No. 7,150,030.

(51) Int. Cl.
*H04N 5/445* (2006.01)
(52) U.S. Cl. .......................... 725/46; 707/10
(58) Field of Classification Search .................. 725/45, 725/46, 47, 48
See application file for complete search history.

(56) References Cited

U.S. PATENT DOCUMENTS

| | | | |
|---|---|---|---|
| 4,258,386 A | 3/1981 | Cheung | 358/84 |
| 4,546,382 A | 10/1985 | McKenna | |
| 4,573,072 A | 2/1986 | Freeman | |
| 4,602,279 A | 7/1986 | Freeman | 358/86 |
| 4,745,549 A | 5/1988 | Hashimoto | 364/402 |
| 4,754,410 A | 6/1988 | Leech | |
| 5,099,319 A | 3/1992 | Esch et al. | 358/86 |
| 5,155,591 A | 10/1992 | Wachob | 358/86 |
| 5,223,924 A | 6/1993 | Strubbe | 358/86 |
| 5,231,494 A | 7/1993 | Wachob | |
| 5,233,423 A | 8/1993 | Jernigan | |
| 5,251,324 A | 10/1993 | McMullan | |

(Continued)

FOREIGN PATENT DOCUMENTS

CA 2286243 4/2001

(Continued)

OTHER PUBLICATIONS

"Data Structures: From Arrays to Priority Queues", by Wayne Amsbury, Wadsworth Publishing Company, 1985, pp. 228, 332 and 333.*

(Continued)

*Primary Examiner*—Scott E. Beliveau
*Assistant Examiner*—James Sheleheda

(57) ABSTRACT

A subscriber characterization system with filters in which the subscriber's selections are monitored, including monitoring of the time duration programming is watched, the volume at which the programming is listened to, and any available information regarding the type of programming, including category and sub-category of the programming. The raw subscriber selection data is then processed to eliminate data associated with irrelevant activities such as channel surfing, channel jumping, or extended periods of inactivity. The actual subscriber selection data is used to form program characteristics vectors. The programming characteristics vectors can be used in combination with the actual subscriber selection data to form a subscriber profile. Heuristic rules indicating the relationships between programming choices and demographics can be applied to generate additional probabilistic subscriber profiles regarding demographics and programming and product interests.

39 Claims, 23 Drawing Sheets

U.S. PATENT DOCUMENTS

| | | |
|---|---|---|
| 5,287,181 A | 2/1994 | Holman |
| 5,319,455 A | 6/1994 | Hoarty et al. ................... 348/7 |
| 5,374,951 A | 12/1994 | Welsh |
| 5,410,344 A | 4/1995 | Graves et al. .................. 348/1 |
| 5,446,919 A | 8/1995 | Wilkins ....................... 455/6.2 |
| 5,448,471 A | 9/1995 | Deaton et al. |
| 5,515,098 A | 5/1996 | Carles |
| 5,529,549 A | 6/1996 | Moyer |
| 5,550,928 A | 8/1996 | Lu |
| 5,559,549 A | 9/1996 | Hendricks et al. |
| 5,565,909 A | 10/1996 | Thibadeau et al. ............. 348/9 |
| 5,579,055 A | 11/1996 | Hamilton |
| 5,585,865 A | 12/1996 | Amano |
| 5,592,560 A | 1/1997 | Deaton |
| 5,596,373 A | 1/1997 | White |
| 5,600,364 A | 2/1997 | Hendricks et al. .............. 348/1 |
| 5,604,542 A | 2/1997 | Dedrick |
| 5,608,445 A | 3/1997 | Mischler |
| 5,619,709 A | 4/1997 | Caid et al. ................... 395/794 |
| 5,632,007 A | 5/1997 | Freeman |
| 5,635,989 A | 6/1997 | Rothmuller |
| 5,636,346 A | 6/1997 | Saxe ........................... 395/201 |
| 5,661,516 A | 8/1997 | Carles |
| 5,682,195 A * | 10/1997 | Hendricks et al. ............. 725/31 |
| 5,687,322 A | 11/1997 | Deaton et al. |
| 5,703,655 A | 12/1997 | Corey |
| 5,704,017 A | 12/1997 | Heckerman et al. ........... 395/61 |
| 5,710,884 A | 1/1998 | Dedrick ................. 395/200.47 |
| 5,724,521 A | 3/1998 | Dedrick ....................... 395/226 |
| 5,740,549 A | 4/1998 | Reilly et al. ................... 705/14 |
| 5,749,081 A | 5/1998 | Whiteis ....................... 707/102 |
| 5,754,938 A | 5/1998 | Herz |
| 5,754,939 A | 5/1998 | Herz et al. |
| 5,758,257 A | 5/1998 | Herz |
| 5,758,259 A * | 5/1998 | Lawler ........................ 725/45 |
| 5,761,601 A | 6/1998 | Nemirofsky et al. ......... 455/3.1 |
| 5,761,662 A | 6/1998 | Dasan .......................... 707/10 |
| 5,765,030 A | 6/1998 | Nachenberg |
| 5,768,592 A | 6/1998 | Chang |
| 5,774,170 A | 6/1998 | Hite et al. ..................... 348/9 |
| 5,774,664 A | 6/1998 | Hidary |
| 5,786,845 A | 7/1998 | Tsuria |
| 5,790,935 A | 8/1998 | Payton |
| 5,794,210 A | 8/1998 | Goldhaber et al. |
| 5,796,952 A | 8/1998 | Davis et al. ............ 395/200.54 |
| 5,801,747 A * | 9/1998 | Bedard ........................ 725/46 |
| 5,805,974 A | 9/1998 | Hite |
| 5,818,935 A | 10/1998 | Maa |
| 5,819,156 A | 10/1998 | Belmont |
| 5,848,396 A | 12/1998 | Gerace ....................... 705/10 |
| 5,857,190 A | 1/1999 | Brown |
| 5,872,588 A | 2/1999 | Aras |
| 5,877,812 A | 3/1999 | Krause |
| 5,883,818 A | 3/1999 | Salimi et al. |
| 5,912,696 A | 6/1999 | Bueh |
| 5,915,243 A | 6/1999 | Smolen ....................... 705/14 |
| 5,918,014 A | 6/1999 | Robinson |
| 5,926,205 A * | 7/1999 | Krause et al. ............... 725/103 |
| 5,930,764 A | 7/1999 | Melchione et al. |
| 5,933,811 A | 8/1999 | Angles |
| 5,948,061 A | 9/1999 | Merriman et al. ........... 709/219 |
| 5,956,637 A | 9/1999 | Ericsson |
| 5,974,299 A | 10/1999 | Massetti |
| 5,974,396 A | 10/1999 | Anderson et al. ............ 705/10 |
| 5,974,398 A | 10/1999 | Hanson |
| 5,974,399 A | 10/1999 | Giuliani et al. ............... 705/14 |
| 5,977,964 A | 11/1999 | Williams |
| 5,991,735 A | 11/1999 | Gerace ....................... 705/10 |
| 6,002,393 A | 12/1999 | Hite |
| 6,005,594 A | 12/1999 | Schein et al. |
| 6,005,597 A | 12/1999 | Barrett et al. ................. 348/1 |

| | | |
|---|---|---|
| 6,009,410 A | 12/1999 | LeMole |
| 6,012,051 A | 1/2000 | Sammon, Jr. et al. ........ 706/52 |
| 6,014,698 A | 1/2000 | Griffiths |
| 6,018,710 A | 1/2000 | Wynblatt |
| 6,020,883 A | 2/2000 | Herz et al. ................... 345/327 |
| 6,026,368 A | 2/2000 | Brown et al. |
| 6,026,370 A | 2/2000 | Jermyn |
| 6,029,195 A * | 2/2000 | Herz .......................... 725/116 |
| 6,032,131 A * | 2/2000 | Vogel .......................... 705/30 |
| 6,055,510 A | 4/2000 | Henrick |
| 6,055,573 A | 4/2000 | Gardenswartz et al. |
| 6,085,031 A | 7/2000 | Johnson et al. |
| 6,088,722 A | 7/2000 | Herz |
| 6,108,637 A | 8/2000 | Blumenau ....................... 705/7 |
| 6,119,098 A | 9/2000 | Guyot et al. .................. 705/14 |
| 6,133,912 A | 10/2000 | Montero |
| 6,134,532 A | 10/2000 | Lazarus et al. ............... 705/14 |
| 6,141,010 A | 10/2000 | Hoyle |
| 6,160,570 A | 12/2000 | Sitnik |
| 6,160,989 A | 12/2000 | Hendricks |
| 6,177,931 B1 * | 1/2001 | Alexander et al. ............ 725/52 |
| 6,205,247 B1 | 3/2001 | Breuer et al. |
| 6,216,129 B1 | 4/2001 | Eldering |
| 6,236,978 B1 | 5/2001 | Tuzhilin |
| 6,286,005 B1 | 9/2001 | Cannon |
| 6,286,140 B1 | 9/2001 | Ivanyi |
| 6,298,348 B1 | 10/2001 | Eldering |
| 6,324,519 B1 | 11/2001 | Eldering |
| 6,327,574 B1 | 12/2001 | Kramer |
| 6,400,996 B1 | 6/2002 | Hoffberg et al. |
| 6,446,261 B1 * | 9/2002 | Rosser ........................ 725/34 |
| 6,457,010 B1 * | 9/2002 | Eldering et al. .............. 707/10 |
| 6,460,036 B1 | 10/2002 | Herz |
| 6,463,585 B1 | 10/2002 | Hendricks |
| 6,560,578 B2 | 5/2003 | Eldering |
| 6,684,194 B1 | 1/2004 | Eldering |
| 6,714,917 B1 | 3/2004 | Eldering |
| 6,820,062 B1 | 11/2004 | Gupta |
| 2001/0049620 A1 | 12/2001 | Eldering |
| 2002/0095676 A1 * | 7/2002 | Knee et al. .................... 725/46 |
| 2002/0194058 A1 | 12/2002 | Eldering |
| 2003/0004810 A1 | 1/2003 | Eldering |
| 2003/0088872 A1 | 5/2003 | Maissel et al. |
| 2003/0135853 A1 * | 7/2003 | Goldman et al. ............. 725/34 |

FOREIGN PATENT DOCUMENTS

| | | |
|---|---|---|
| CA | 2323166 | 4/2001 |
| GB | 2348346 | 9/2000 |
| GB | 2348530 | 10/2000 |
| WO | 9712486 | 4/1997 |
| WO | 9717774 | 5/1997 |
| WO | 9741673 | 11/1997 |
| WO | 9821877 | 5/1998 |
| WO | 9828906 | 7/1998 |
| WO | 9834189 | 8/1998 |
| WO | WO98721713 | 11/1998 |
| WO | 9901984 | 1/1999 |
| WO | 9904561 | 1/1999 |
| WO | WO 9901984 A1 * | 1/1999 |
| WO | 9944159 | 9/1999 |
| WO | WO9952285 | 10/1999 |
| WO | WO9960789 | 11/1999 |
| WO | WO9965237 | 12/1999 |
| WO | WO9966719 | 12/1999 |
| WO | 0008802 | 2/2000 |
| WO | 0013434 | 3/2000 |
| WO | 0014951 | 3/2000 |
| WO | WO0022818 | 4/2000 |
| WO | 0033224 | 6/2000 |
| WO | WO0049801 | 8/2000 |
| WO | 0054504 | 9/2000 |
| WO | 0055748 | 9/2000 |

| | | |
|---|---|---|
| WO | 0124027 | 4/2001 |

OTHER PUBLICATIONS

IEEE Publication "A Framework for Targeting Banner Advertising on the Internet", by Gallagher, K. and Parson, J., Jan. 1997, 12 pages.
U.S. Appl. No. 09/204,888, filed Dec. 3, 2000, Eldering.
U.S. Appl. No. 09/591,577, filed Jun. 9, 2000, Eldering.
U.S. Appl. No. 09/857,256, filed Dec. 2, 1998, Eldering.
U.S. Appl. No. 09/205,119, filed Dec. 3, 1998, Eldering.
U.S. Appl. No. 09/516,314, filed Mar. 1, 2000, Eldering.
U.S. Appl. No. 09/635,252, filed Aug. 9, 2000, Eldering.
Raskutti, et al., "Acquiring Customer Preferences for Information Filtering: a Heuristic-Statistical Approach", Proceedings of the 5th Int'l Conference on User Modeling, Kaluna-Kona, HI, USA, Jan. 2-5, 1996.
U.S. Appl. No. 09/635,542, Charles A. Eldering.
U.S. Appl. No. 09/205,119, Charles A. Eldering.
U.S. Appl. No. 11/196,774, Gregory Flickinger.
U.S. Appl. No. 09/857,160, Charles A. Eldering.
U.S. Appl. No. 09/857,256, Charles A. Eldering.
U.S. Appl. No. 09/807,887, Charles A. Eldering.
Marketing Literature, Broadvision, "The Power of Personalization", 3 pgs, Aug. 21, 1998.
Product Literature, Engage Technologies, "Engage.Discover", www.engagetech.com, 13 pgs, Jul. 9, 1998.
Marketing Literature, Firefly Corporation, "Firefly Passport Office", www.firefly.net, 8 pgs, Jun. 20, 1998.
Media Metrix, "Frequently Asked Questions", www.mediametrix.com, 2 pgs, Jun. 30, 1998.
Net Perceptions Corporation, "Adding Value in the Digital Age", www.netperceptions.com, 11 pgs, Jun. 30, 1998.
Product Data Sheet, Open Sesame, "Learn Sesame", www.opensesame.com, 3 pgs, Jul. 9, 1998.
Product Literature, Aptex Software, Inc. "SelectCast for Commerce Servers", www.aptex.com, 2 pgs, Jun. 30, 1998.
Product Literature, Aptex Software, Inc., "SelectCast for Ad Servers", www.aptex.com, 2 pgs, Jun. 30, 1998.

* cited by examiner

| TIME | CHANNEL ID | PROGRAM TITLE | VOLUME |
|---|---|---|---|
| 08:01:25AM | 06 | "MORNING TV" | 5/10 |
| 08:01:45AM | 13 | "GOOD MORNING AMERICA" | 5/10 |
| 08:03:25AM | 13 | "GOOD MORNING AMERICA" | 6/10 |
| ... | | | |
| 06:11:25PM | 09 | "SEINFELD" | 5/10 |
| 06:15:23PM | 09 | "ADVERTISING" | 5/10 |
| 06:17:25PM | 09 | "SEINFELD" | 5/10 |
| 06:28:10PM | 09 | "ADVERTISING" | 5/10 |
| 06:30:07PM | 52 | "LIVING SINGLE" | 5/10 |
| ... | | | |

*FIG. 6A*

| TIME OF DAY | MINUTES WATCHED | CHANNEL CHANGES | AVERAGE VOLUME |
|---|---|---|---|
| MORNING (6AM-9AM) | 61 | 2 | 5/10 |
| MID-DAY (9AM-3PM) | 0 | 0 | - |
| AFTERNOON (3PM-6PM) | 0 | 0 | - |
| NIGHT (6PM-10PM) | 122 | 4 | 6/10 |
| LATE NIGHT (12AM-6AM) | 0 | 0 | - |
| TOTAL | 183 | 6 | 5.7/10 |

| CATEGORIES | DEMOGRAPHIC GROUPS | | | | | | | | | | |
|---|---|---|---|---|---|---|---|---|---|---|---|
| | AGE | | | INCOME | | | SIZE | | | GENDER | |
| | 0-10 | 10-18 ... | >70 | 0-20K | 20-50K ... | 50-100K | 1 | 2 ... | >5 | M | F |
| NEWS | 0.1 | 0.1 | 0.4 | 0.2 | 0.3 | 0.4 | 0.5 | 0.3 | 0.1 | 0.3 | 0.7 |
| FICTION | 0.5 | 0.3 | 0.2 | 0.4 | 0.2 | 0.3 | 0.3 | 0.2 | 0.1 | 0.8 | 0.2 |
| FACTUAL | 0.2 | 0.2 | 0.3 | 0.1 | 0.4 | 0.2 | 0.2 | 0.2 | 0.4 | 0.4 | 0.6 |
| ... | | | | | | | | | | | |
| ADVERTISING | 0.1 | 0.3 | 0.5 | 0.3 | 0.2 | 0.1 | 0.2 | 0.1 | 0.3 | 0.5 | 0.5 |

*FIG. 10B*

| HOUSEHOLD PARAMETER | AVERAGE VALUE | SESSION VALUE | UPDATE? |
|---|---|---|---|
| SIZE | 2.6 | 3.0 | YES |
| AGE | 23.5 | 12 | YES |
| SEX (FEMALE=1) | 0.6 | 0.7 | YES |
| INCOME ($0-$20K) | 0.1 | 0.1 | YES |
| INCOME ($20-$50K) | 0.6 | 0.7 | YES |
| INCOME ($50-$100K) | 0.2 | 0.1 | YES |
| INCOME (>$100K) | 0.1 | 0.1 | YES |
| ZIP CODE | | | NO |
| TELEPHONE NUMBER | | | NO |

*FIG. 15*

|  | HOUSEHOLD INTEREST | AVERAGE VALUE | SESSION VALUE |
|---|---|---|---|
| PROGRAMMING | DRAMA | 0.1 | 0.20 |
| | ROMANCE | 0.1 | 0.20 |
| | ACTION | 0.6 | 0.25 |
| | SITCOM | 0.2 | 0.30 |
| | ⋮ | | |
| | SPORTS | 0 | 0.05 |
| PRODUCTS | HEALTH/EXCERCISE | 0.6 | 0.2 |
| | FOOD | 0.3 | 0.4 |
| | CHILD RELATED | 0.0 | 0.1 |
| | TOYS | 0.0 | 0.1 |
| | ⋮ | | |
| | AUTOMOBILE | 0.1 | 0.2 |

*FIG. 17*

SUBSCRIBER CHARACTERIZATION SYSTEM WITH FILTERS

This application is a Continuation-In-Part (CIP) of U.S. application Ser. No. 09/204,888 filed on Dec. 3, 1998 now U.S. Pat. No. 7,150,030.

BACKGROUND OF THE INVENTION

Subscribers face an increasingly large number of choices for entertainment programming, which is delivered over networks such as cable TV systems, over-the-air broadcast systems, and switched digital access systems which use telephone company twisted wire pairs for the delivery of signals.

Cable television service providers have typically provided one-way broadcast services but now offer high-speed data services and can combine traditional analog broadcasts with digital broadcasts and access to Internet web sites. Telephone companies can offer digital data and video programming on a switched basis over digital subscriber line technology. Although the subscriber may only be presented with one channel at a time, channel change requests are instantaneously transmitted to centralized switching equipment and the subscriber can access the programming in a broadcast-like manner. Internet Service Providers (ISPs) offer Internet access and can offer access to text, audio, and video programming which can also be delivered in a broadcast-like manner in which the subscriber selects "channels" containing programming of interest. Such channels may be offered as part of a video programming service or within a data service and can be presented within an Internet browser.

Along with the multitude of programming choices which the subscriber faces, subscribers are subject to advertisements, which in many cases subsidize or pay for the entire cost of the programming. While advertisements are sometimes beneficial to subscribers and deliver desired information regarding specific products or services, consumers generally view advertising as a "necessary evil" for broadcast-type entertainment.

In order to deliver more targeted programming and advertising to subscribers, it is necessary to understand their likes and dislikes to a greater extent than is presently done today. Systems which identify subscriber preferences based on their purchases and responses to questionnaires allow for the targeted marketing of literature in the mail, but do not in any sense allow for the rapid and precise delivery of programming and advertising which is known to have a high probability of acceptance to the subscriber. In order to determine which programming or advertising is appropriate for the subscriber, knowledge of that subscriber and the subscriber product and programming preferences is required.

Specific information regarding a subscriber's viewing habits or the Internet web sites they have accessed can be stored for analysis, but such records are considered private and subscribers are not generally willing to have such information leave their control. Although there are regulatory models which permit the collection of such data on a "notice and consent" basis, there is a general tendency towards legal rules which prohibit such raw data to be collected.

SUMMARY OF THE INVENTION

For the foregoing reasons, there is a need for a subscriber characterization system which may generate and store subscriber characteristics that reflect the probable demographics and preferences of the subscriber and household.

The present invention includes a system for characterizing subscribers watching video or multimedia programming based on monitoring their detailed selection choices including the time duration of their viewing, the number of channel changes, the volume at which the programming is listened, the program selection, and collecting text information about that programming to determine what type of programming the subscriber is most interested in.

Furthermore, the system is equipped with one or more filters that assist in determining selection data associated with irrelevant activities by the subscriber which should be excluded from the actual viewing selection data, e.g., selection data associated with channel surfing and/or channel jumping (up and down) activities by the subscriber.

The channel surfing activity refers to one or more rapid channel changes initiated by the subscriber for the purpose of selecting a channel/program for actual viewing. Generally, the subscriber selects a channel, and views the contents of the program at the selected channel for few seconds (about 3-4 seconds), and then changes the channel to view the contents of the next channel. Such rapid changes generally occur a few times in a row before the subscriber selects a channel/programming for actual viewing. The filters of the present invention are configured to detect channel surfing activities by the subscriber by monitoring and evaluating associated viewing times, thereby the channel surfing activities are not considered in the determination of actual viewing selections.

The channel jumping refers to an activity wherein the subscriber changes channels very rapidly in order to move from an existing channel to a desired channel. Therein, the subscriber is not channel surfing, instead the subscriber already knows the intended channel/program for actual viewing and is jumping channels to reach the desired channels, e.g., the subscriber is at channel number 6, and wants to go to channel number 12, the subscriber may jump the channel by changing the channel six times. Generally, in channel jumping, the channel changes occur very rapidly and the viewing time at the each channel is very brief, e.g., less than one second. The filters of the present invention are configured to detect channel jumping, thereby the channel jumping activities are not considered in the determination of actual viewing selections.

The filters of the present invention are also capable of monitoring extended spans of inactivity, e.g., a lack of any channel changes, volume changes, or any other selection changes activity for more than 3 hours. Such spans of inactivity are considered "dead periods" implying that subscriber is not actively watching the video and/or other multimedia programming. The reasons for such dead periods may be caused by the fact that the subscriber has left the room, or the subscriber is not active (e.g., the subscriber has gone to sleep or has dozed off), or the fact that the subscriber is actively engaging in another activity within the room and is not attending to the programming.

The system of the present invention analyzes the actual viewing selections made by the subscriber or the subscriber household, and generates a demographic description of the subscriber or household. This demographic description describes the probable age, income, gender and other demographics. The resulting characterization includes probabilistic determinations of what other programming or products the subscriber/household will be interested in.

The present invention also encompasses the use of heuristic rules in logical form or expressed as conditional probabilities to aid in forming a subscriber profile. The heuristic rules in logical form allow the system to apply generalizations that have been learned from external studies to obtain a characterization of the subscriber. In the case of conditional probabilities, determinations of the probable content of a program can be applied in a mathematical step to a matrix of conditional probabilities to obtain probabilistic subscriber profiles indicating program and product likes and dislikes as well for determining probabilistic demographic data.

In accordance with the principles of the present invention, the resulting probabilistic information can be stored locally and controlled by the subscriber, or can be transferred to a third party that can provide access to the subscriber characterization. The information can also be encrypted to prevent unauthorized access in which case only the subscriber or someone authorized by the subscriber can access the data.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 6A illustrates a time of day detailed record;

FIG. 7 illustrates a household viewing habits statistical table;

FIG. 10B illustrates a set of heuristic rules expressed in terms of conditional probabilities;

FIG. 15 illustrates average and session household demographic data;

FIG. 17 illustrates a household interest profile including programming and product profiles.

DETAILED DESCRIPTION OF THE PREFERRED EMBODIMENT

Figure 1A:
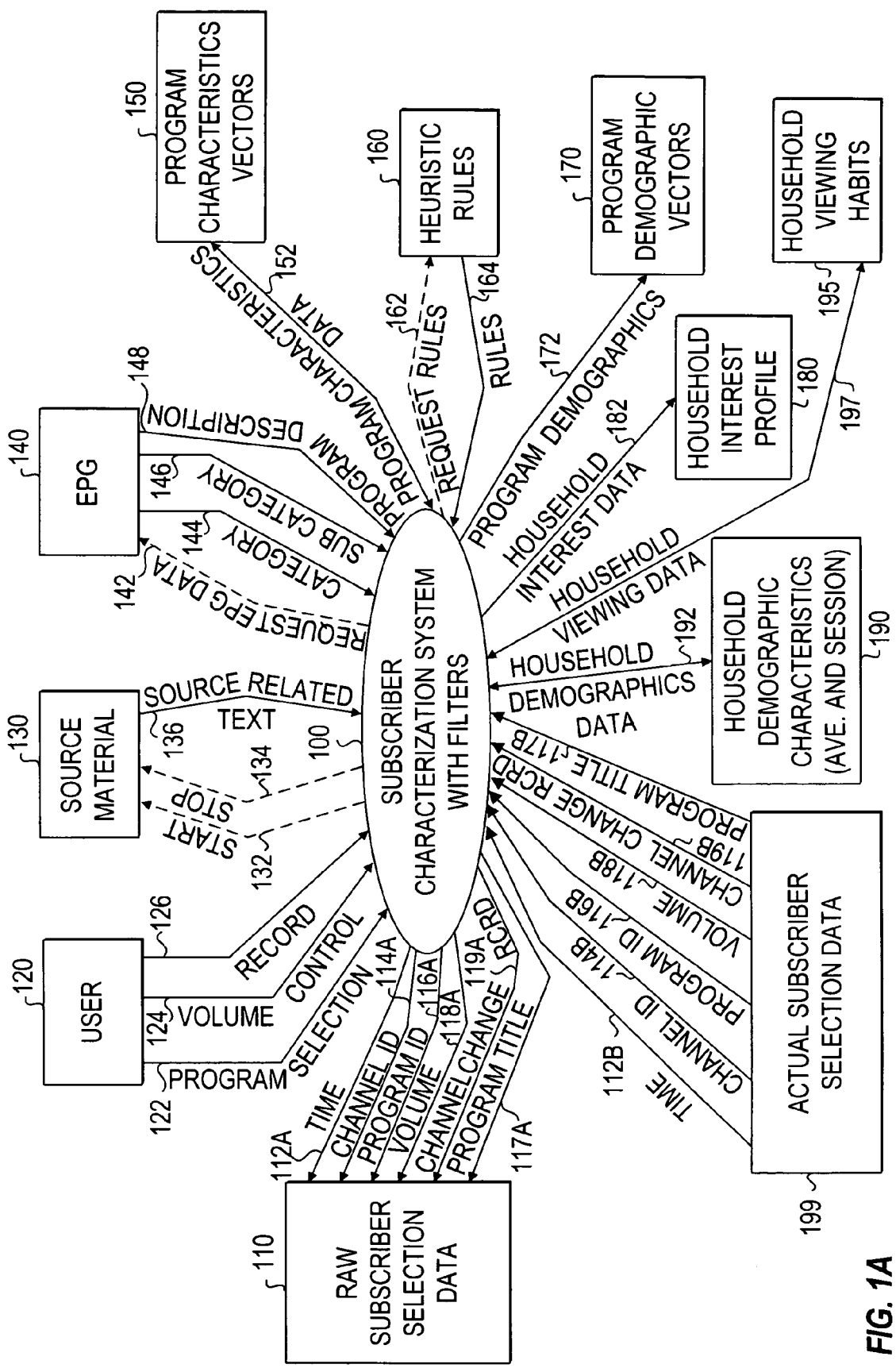
FIG. 1A illustrates a context diagram for a subscriber characterization system having filters.

In describing a preferred embodiment of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

With reference to the drawings, in general, and FIGS. 1 through 17 in particular, the apparatus of the present invention is disclosed.

The present invention is directed at an apparatus for generating a subscriber profile that contains useful information regarding the subscriber likes and dislikes. Such a profile is useful for systems which provide targeted programming or advertisements to the subscriber, and allow material (programs or advertisements) to be directed at subscribers who will have a high probability of liking the program or a high degree of interest in purchasing the product.

Since there are typically multiple individuals in a household, the subscriber characterization may not be a characterization of an individual subscriber but may instead be a household average. When used herein, the term subscriber refers both to an individual subscriber as well as the average characteristics of a household of multiple subscribers.

In the present system the programming viewed by the subscriber, both entertainment and advertisement, can be studied and processed by the subscriber characterization system. In this study, system filters are configured to eliminate selection data associated with irrelevant activities from the actual selection data. The actual selection data is then used to determine the program characteristics. This determination of the program characteristics is referred to as a program characteristics vector. This vector may be a truly one-dimensional vector, but can also be represented as an n dimensional matrix which can be decomposed into vectors.

The subscriber profile vector represents a profile of the subscriber (or the household of subscribers) and can be in the form of a demographic profile (average or session) or a program or product preference vector. The program and product preference vectors are considered to be part of a household interest profile which can be thought of as an n dimensional matrix representing probabilistic measurements of subscriber interests.

In the case that the subscriber profile vector is a demographic profile, the subscriber profile vector indicates a probabilistic measure of the age of the subscriber or average age of the viewers in the household, sex of the subscriber, income range of the subscriber or household, and other such demographic data. Such information comprises household demographic characteristics and is composed of both average and session values. Extracting a single set of values from the household demographic characteristics can correspond to a subscriber profile vector.

The household interest profile can contain both programming and product profiles, with programming profiles corresponding to probabilistic determinations of what programming the subscriber (household) is likely to be interested in, and product profiles corresponding to what products the subscriber (household) is likely to be interested in. These profiles contain both an average value and a session value, the average value being a time average of data, where the averaging period may be several days, weeks, months, or the time between resets of unit.

Since a viewing session is likely to be dominated by a particular viewer, the session values may, in some circumstances, correspond most closely to the subscriber values, while the average values may, in some circumstances, correspond most closely to the household values.

FIG. 1A depicts the context diagram of a preferred embodiment of a Subscriber Characterization System with Filters (SCSF) 100. A context diagram, in combination with entity-relationship diagrams, provide a basis from which one skilled in the art can realize the present invention. The present invention can be realized in a number of programming languages including C, C++, Perl, and Java, although the scope of the invention is not limited by the choice of a particular programming language or tool. Object oriented languages have several advantages in terms of construction of the software used to realize the present invention, although the present invention can be realized in procedural or other types of programming languages known to those skilled in the art.

Filters of SCSF 100 may be a computer means or a software module configured with some predetermined rules. These predetermined rules assist in recognizing irrelevant activities and the elimination of the selection data from the raw subscriber selection data. Filters and their related processing are described in detail later.

In the process of collecting raw subscriber selection data, the SCSF 100 receives from a user 120 commands in the form of a volume control signal 124 or program selection data 122 which can be in the form of a channel change but may also be an address request which requests the delivery of programming from a network address. A record signal 126 indicates that the programming or the address of the programming is being recorded by the user. The record signal 126 can also be a printing command, a tape recording command, a bookmark command or any other command intended to store the program being viewed, or program address, for later use.

The material being viewed by the user 120 is referred to as source material 130. The source material 130, as defined herein, is the content that a subscriber selects and may consist of analog video, Motion Picture Expert Group (MPEG) digital video source material, other digital or analog material, Hypertext Markup Language (HTML) or other type of multimedia source material. The subscriber characterization system 100 can access the source material 130 received by the user 120 using a start signal 132 and a stop signal 134, which control the transfer of source related text 136 which can be analyzed as described herein.

In a preferred embodiment, the source related text 136 can be extracted from the source material 130 and stored in memory. The source related text 136, as defined herein, includes source related textual information including descriptive fields which are related to the source material 130, or text which is part of the source material 130 itself. The source related text 136 can be derived from a number of sources including but not limited to closed-captioning information, Electronic Program Guide (EPG) material, and text information in the source itself (e.g. text in HTML files).

Electronic Program Guide (EPG) 140 contains information related to the source material 130 which is useful to the user 120. The EPG 140 is typically a navigational tool which contains source related information including but not limited to the programming category, program description, rating, actors, and duration. The structure and content of EPG data is described in detail in U.S. Pat. No. 5,596,373 assigned to Sony Corporation and Sony Electronics which is herein incorporated by reference. As shown in FIG. 1, the EPG 140 can be accessed by the SCSF 100 by a request EPG data signal 142 which results in the return of a category 144, a sub-category 146, and a program description 148.

In one embodiment of the present invention, EPG data is accessed and program information such as the category 144, the sub-category 146, and the program description 148 are stored in memory.

In another embodiment of the present invention, the source related text 136 is the closed-captioning text embedded in the analog or digital video signal. Such closed-captioning text can be stored in memory for processing to extract the program characteristic vectors 150.

The raw subscriber selection data 110 is accumulated from the monitored activities of the user. The raw subscriber selection data 110 includes time 112A, which corresponds to the time of an event, channel ID 114A, program ID 116A, program title 117A, volume level 118A, and channel change record 119A. A detailed record of selection data is illustrated in FIG. 6A.

Generally, the raw subscriber selection data 110 contains the raw data accumulated over a predetermined period of time and relates to viewing selections made by the subscriber over the predetermined period of time. The filters of SCSF 100 evaluate the raw subscriber selection data 110, eliminate any selection data associated with irrelevant activities, and in turn generate actual subscriber selection data 199 that corresponds only to the actual viewing selections made by the subscriber. The actual subscriber selection data 199 comprises time 112B, which corresponds to the time of an actual viewing event exclusive of channel surfing, channel jumping or dead periods, channel ID 114B, program ID 116B, program title 117B, volume level 118B, and channel change record 119B.

The raw subscriber selection data 110 may be processed in accordance with some pre-determined heuristic rules to generate actual subscriber selection data 199. In one embodiment, the selection data associated with channel surfing, channel jumping and dead periods is eliminated from the raw subscriber selection data to generate actual subscriber selection data 199.

Based on the actual subscriber selection data 199, SCSF 100 generates one or more program characteristics vectors 150 which are comprised of program characteristics data 152, as illustrated in FIG. 1. The program characteristics data 152, which can be used to create the program characteristics vectors 150 both in vector and table form, are examples of source related information which represent characteristics of the source material. In a preferred embodiment, the program characteristics vectors 150 are lists of values which characterize the programming (source) material in accordance to the category 144, the sub-category 146, and the program description 148. The present invention may also be applied to advertisements, in which case program characteristics vectors contain, as an example, a product category, a product sub-category, and a brand name.

As illustrated in FIG. 1A, the SCSF 100 uses heuristic rules 160. The heuristic rules 160, as described herein, are composed of both logical heuristic rules as well as heuristic rules expressed in terms of conditional probabilities. The heuristic rules 160 can be accessed by the SCSF 100 via a request rules signal 162 which results in the transfer of a copy of rules 164 to the SCSF 100.

The SCSF 100 forms program demographic vectors 170 from program demographics 172, as illustrated in FIG. 1A. The program demographic vectors 170 also represent characteristics of source related information in the form of the intended or expected demographics of the audience for which the source material is intended.

In a preferred embodiment, household viewing data 197, as illustrated in FIG. 1A, is computed from the actual subscriber selection data 199. The household viewing data 197 is derived from the actual subscriber selection data 199 by looking at viewing habits at a particular time of day over an extended period of time, usually several days or weeks, and making some generalizations regarding the viewing habits during that time period. The SCSF 100 also transforms household viewing data 197 to form household viewing habits 195, i.e. statistical representation of subscriber/household viewing data illustrating patterns in viewing.

The program characteristics vector 150 is derived from the source related text 136 and/or from the EPG 140 by applying information retrieval techniques. The details of this process are discussed in accordance with FIG. 8.

The program characteristics vector 150 is used in combination with a set of the heuristic rules 160 to define a set of the program demographic vectors 170 illustrated in FIG. 1A describing the audience the program is intended for.

One output of the SCSF 100 is a household profile including household demographic characteristics 190 and a household interest profile 180. The household demographic characteristics 190 resulting from the transfer of household demographic data 192, and the household interest profile 180, resulting from the transfer of household interests data 182. Both the household demographics characteristics 190 and the household interest profile 180 have a session value and an average value, as will be discussed herein.

Figure 1B:
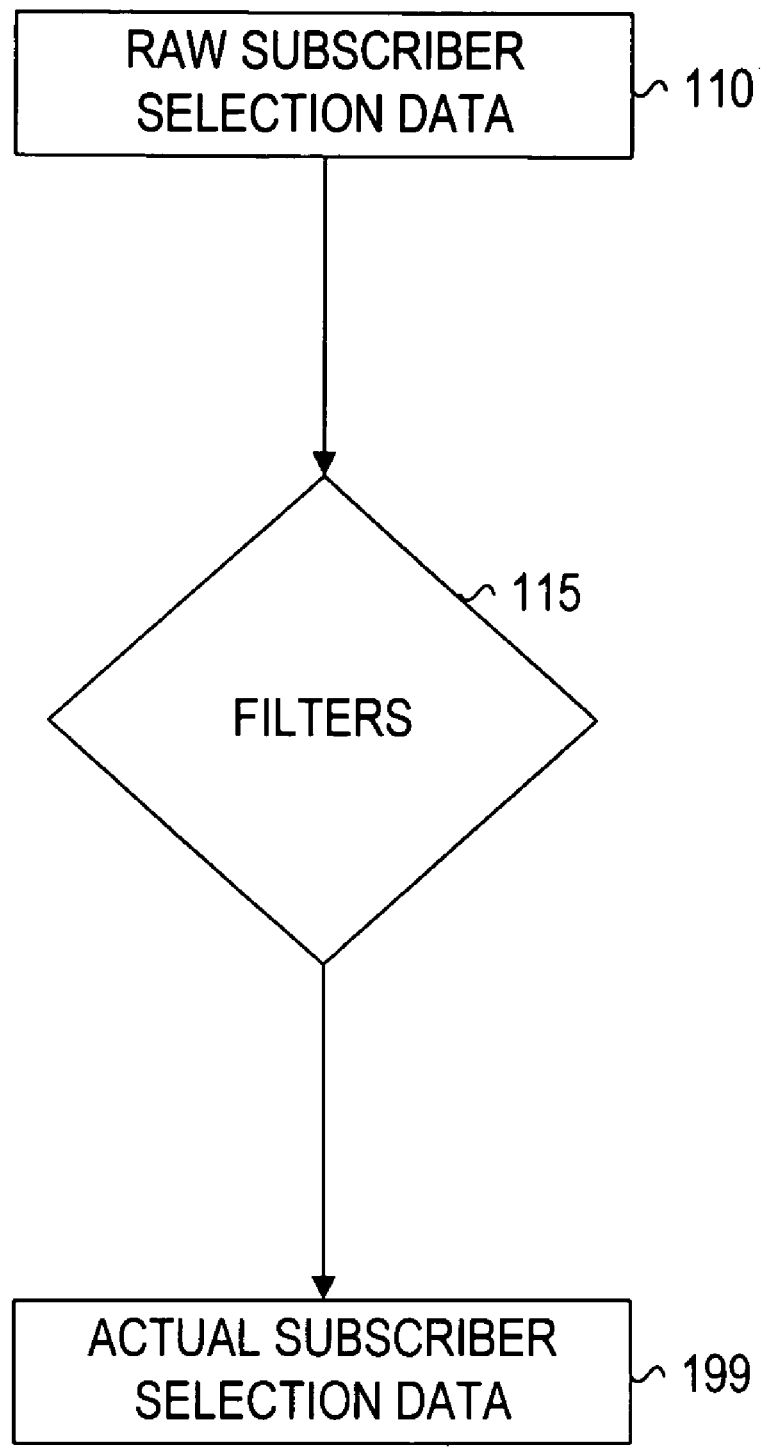
FIG. 1B illustrates a functional diagram of the processing utilized by filters.

Referring now to FIG. 1B, exemplary processing of Filters is shown. As mentioned before, filters 150 evaluate the subscriber selection data 110 to determine any data associated with irrelevant selection activities and then generate actual subscriber selection data 199 which does not include irrelevant selection data. The irrelevant selection data generally corresponds to channel surfing, channel jumping, or dead periods activities. These activities are generally recognized by reviewing corresponding viewing times. In the case of channel surfing or channel jumping, the associated viewing times are very brief, a few milliseconds or a few seconds. In the case of dead periods, the viewing time is relatively long having no actions, e.g., a few hours.

Figure 2:
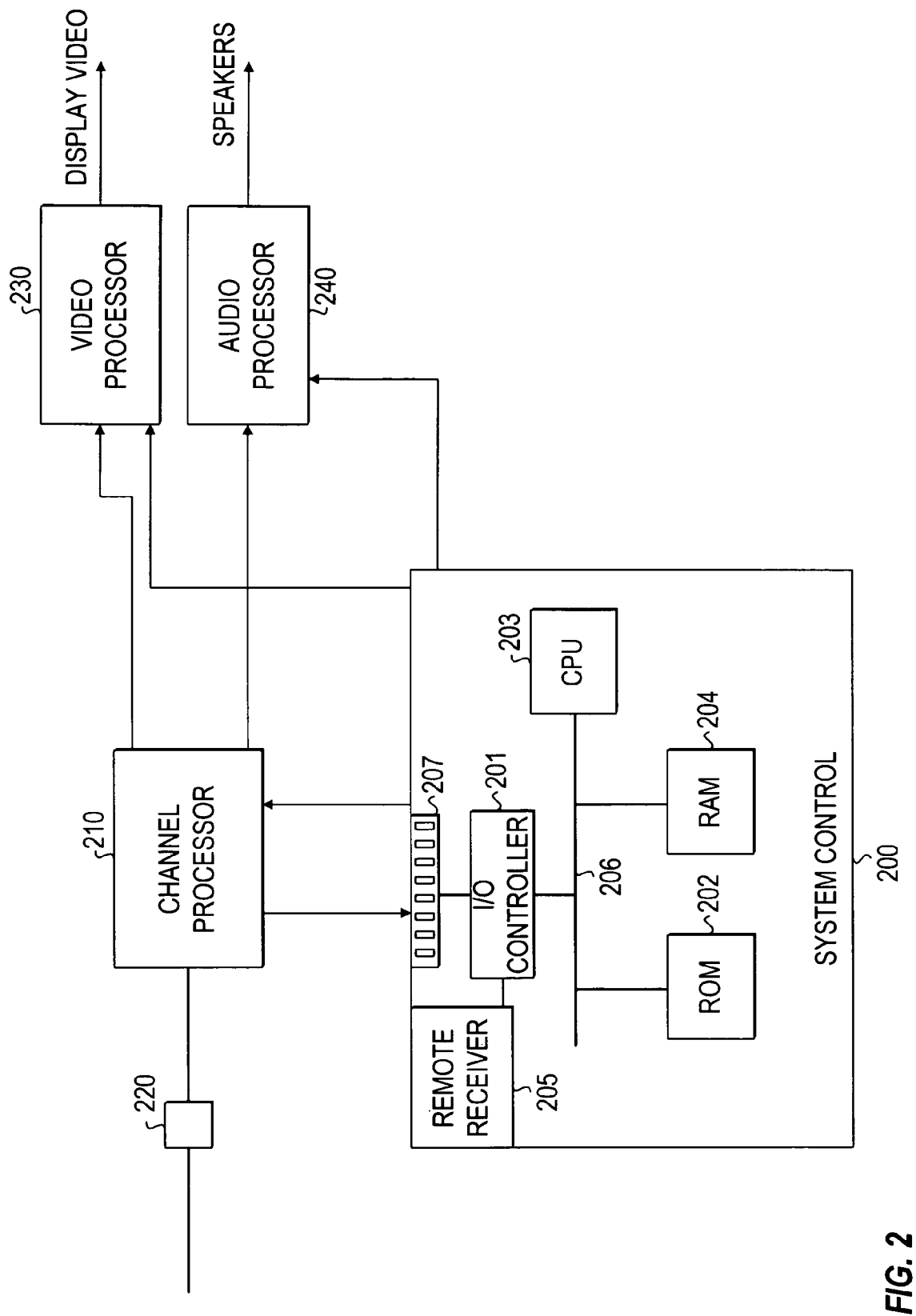
FIG. 2 illustrates a block diagram for a realization of a subscriber monitoring system for receiving video signals.

The monitoring system depicted in FIG. 2 is responsible for monitoring the subscriber activities, and can be used to realize the SCSF 100. In a preferred embodiment, the monitoring system of FIG. 2 is located in a television set-top device or in the television itself. In an alternate embodiment, the monitoring system is part of a computer which receives programming from a network.

In an application of the system for television services, an input connector 220 accepts the video signal coming either from an antenna, cable television input, or other network. The video signal can be analog or Digital MPEG. Alternatively, the video source may be a video stream or other multimedia stream from a communications network including the Internet.

As illustrated in FIG. 2, a system control unit 200 receives commands from the user 120, decodes the command and forwards the command to the destined module. In a preferred embodiment, the commands are entered via a remote control to a remote receiver 205 or a set of selection buttons 207 available at the front panel of the system control unit 200. In an alternate embodiment, the commands are entered by the user 120 via a keyboard.

The system control unit 200 also contains a Central Processing Unit (CPU) 203 for processing and supervising all of the operations of the system control unit 200, a Read Only Memory (ROM) 202 containing the software and fixed data, a Random Access Memory (RAM) 204 for storing data. CPU 203, RAM 204, ROM 202, and I/O controller 201 are attached to a master bus 206. A power supply in a form of battery can also be included in the system control unit 200 for backup in case of power outage.

An input/output (I/O) controller 201 interfaces the system control unit 200 with external devices. In a preferred embodiment, the I/O controller 201 interfaces to the remote receiver 205 and a selection button such as the channel change button on a remote control. In an alternate embodiment, it can accept input from a keyboard or a mouse.

The program selection data 122 is forwarded to a channel processor 210. The channel processor 210 tunes to a selected channel and the media stream is decomposed into its basic components: the video stream, the audio stream, and the data stream. The video stream is directed to a video processor module 230 where it is decoded and further processed for display to the TV screen. The audio stream is directed to an audio processor 240 for decoding and output to the speakers.

The data stream can be EPG data, closed-captioning text, Extended Data Service (EDS) information, a combination of these, or an alternate type of data. In the case of EDS the call sign, program name and other useful data are provided. In a preferred embodiment, the data stream is stored in a reserved location of the RAM 204. In an alternate embodiment, a magnetic disk is used for data storage. The system control unit 200 writes also in a dedicated memory, which in a preferred embodiment is the RAM 204, the selected channel, the time 112A of selection, the volume level 118A and the program ID 116A and the program title 117A. Upon receiving the program selection data 122, the new selected channel is directed to the channel processor 210 and the system control unit 200 writes to the dedicated memory the channel selection end time and the program title 117A at the time 112A of channel change. The system control unit 200 keeps track of the number of channel changes occurring during the viewing time via the channel change record 119A. This data forms part of the raw subscriber selection data 110.

The volume control signal 124A is sent to the audio processor 240. In a preferred embodiment, the volume level 118A selected by the user 120 corresponds to the listening volume. In an alternate embodiment, the volume level 118A selected by the user 120 represents a volume level to another piece of equipment such as an audio system (home theatre system) or to the television itself. In such a case, the volume can be measured directly by a microphone or other audio sensing device which can monitor the volume at which the selected source material is being listened.

A program change occurring while watching a selected channel is also logged by the system control unit 200. Monitoring the content of the program at the time of the program change can be done by reading the content of the EDS. The EDS contains information such as the program title, which is transmitted via the VBI. A change on the program title field is detected by the monitoring system and logged as an event. In an alternate embodiment, an EPG is present and program information can be extracted from the EPG. In a preferred embodiment, the programming data received from the EDS or EPG permits distinguishing between entertainment programming and advertisements.

Figure 3:
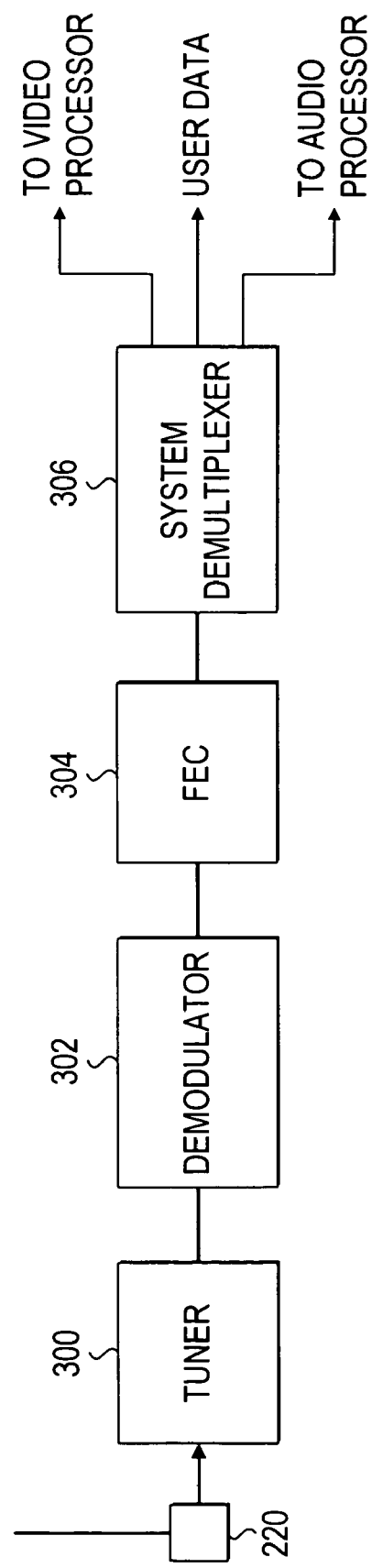
FIG. 3 illustrates a block diagram of a channel processor.

FIG. 3 shows the block diagram of the channel processor 210. In a preferred embodiment, the input connector 220 connects to a tuner 300 which tunes to the selected channel. A local oscillator can be used to heterodyne the signal to the IF signal. A demodulator 302 demodulates the received signal and the output is fed to an FEC decoder 304. The data stream received from the FEC decoder 304 is, in a preferred embodiment, in an MPEG format. In a preferred embodiment, system demultiplexer 306 separates out video and audio information for subsequent decompression and processing, as well as ancillary data which can contain program related information.

The data stream presented to the system demultiplexer 306 consists of packets of data including video, audio and ancillary data. The system demultiplexer 306 identifies each packet from the stream ID and directs the stream to the corresponding processor. The video data is directed to the video processor module 230 and the audio data is directed to the audio processor 240. The ancillary data can contain closed-captioning text, emergency messages, program guide, or other useful information.

Closed-captioning text is considered to be ancillary data and is thus contained in the video stream. The system demultiplexer 306 accesses the user data field of the video stream to extract the closed-captioning text. The program guide, if present, is carried on data stream identified by a specific transport program identifier.

In an alternate embodiment, analog video can be used. For analog programming, ancillary data such as closed-captioning text or EDS data are carried in a vertical blanking interval.

Figure 4:
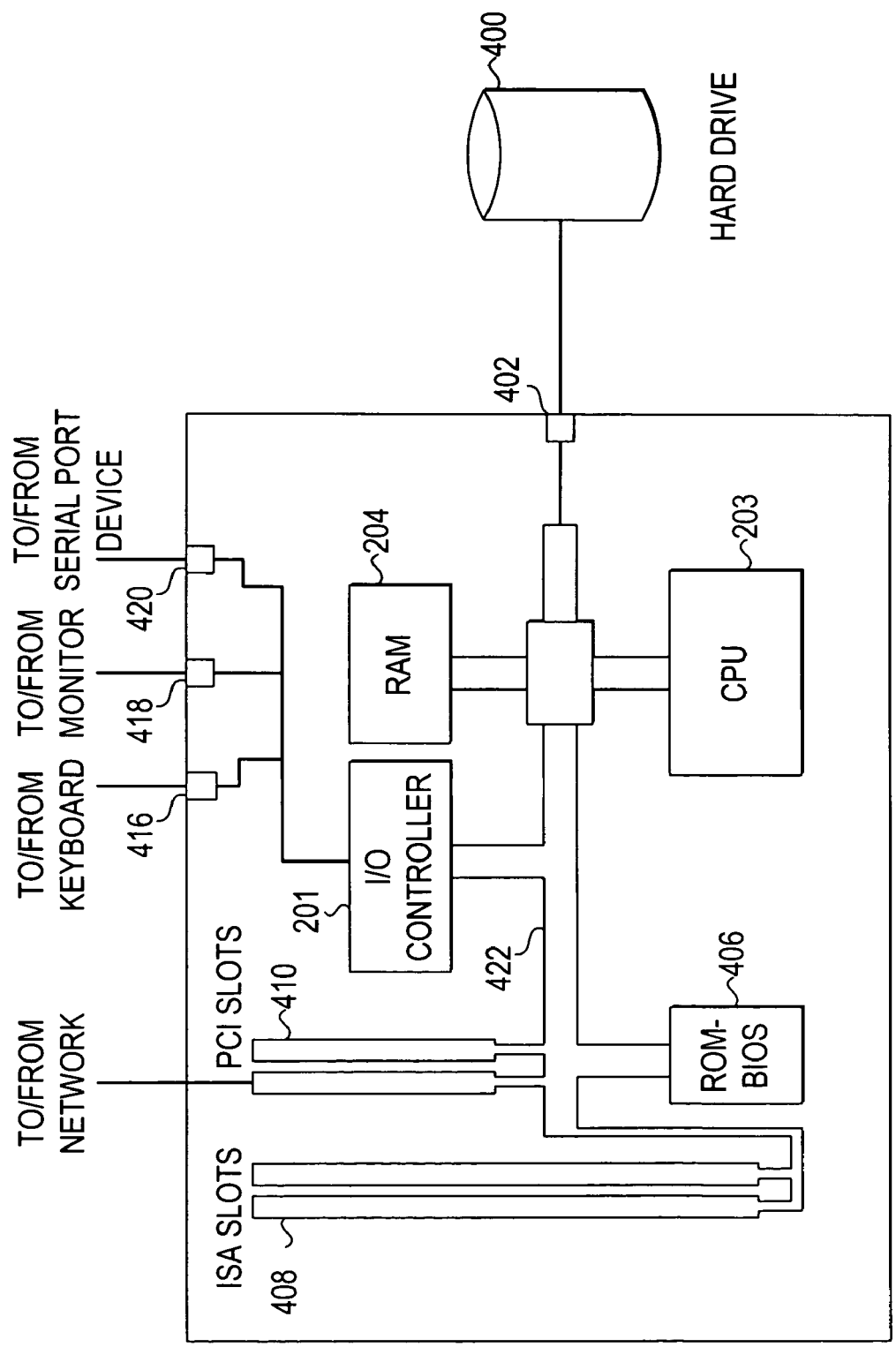
FIG. 4 illustrates a block diagram of a computer for a realization of the subscriber monitoring system.

FIG. 4 shows the block diagram of a computer system for a realization of the subscriber monitoring system based on the reception of multimedia signals from a bi-directional network. A system bus 422 transports data amongst the CPU 203, the RAM 204, Read Only Memory-Basic Input Output System (ROM-BIOS) 406 and other components. The CPU 203 accesses a hard drive 400 through a disk controller 402. The standard input/output devices are connected to the system bus 422 through the I/O controller 201. A keyboard is attached to the I/O controller 201 through a keyboard port 416 and the monitor is connected through a monitor port 418. The serial port device uses a serial port 420 to communicate with the I/O controller 201. Industry Standard Architecture (ISA) expansion slots 408 and Peripheral Component Interconnect (PCI) expansion slots 410 allow additional cards to be placed into the computer. In a preferred embodiment, a network card is available to interface a local area, wide area, or other network.

Figure 5:
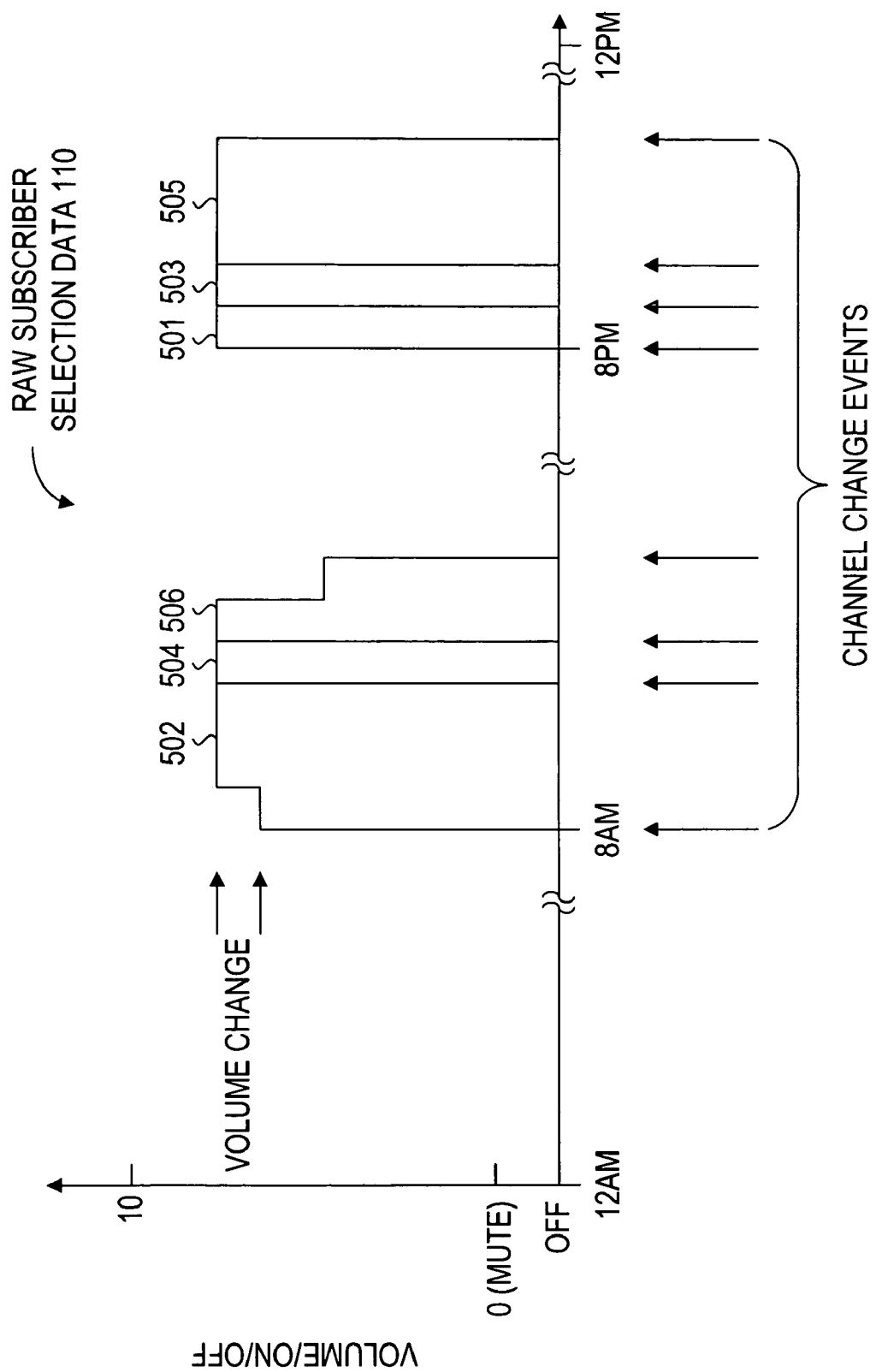
FIG. 5 illustrates a channel sequence and volume over a twenty-four (24) hour period.

FIG. 5 illustrates a channel sequence and volume over a twenty-four (24) hour period. The Y-axis represents the status of the receiver in terms of on/off status and volume level. The X-axis represents the time of day. The channels viewed are represented by the windows 501-506, with a first channel 502 being watched followed by the viewing of a second channel 504, and a third channel 506 in the morning. In the evening a fourth channel 501 is watched, a fifth channel 503, and a sixth channel 505. A channel change is illustrated by a momentary transition to the "off" status and a volume change is represented by a change of level on the Y-axis.

A detailed record of the raw subscriber selection data 110 is illustrated in FIG. 6A in a table format. A time column 602 contains the starting time of every event occurring during the viewing time. A Channel ID column 604 lists the channels viewed or visited during that period. A program title column 603 contains the titles of all programs viewed. A volume column 601 contains the volume level 118 at the time 112 of viewing a selected channel.

Generally, the raw subscriber selection data 110 is unprocessed data and comprises the data associated with irrelevant or inconsequential activities, e.g., channel surfing, channel jumping, or dead activities. Thus, before subscriber/household viewing habits 195 are determined, the raw subscriber selection data 110 is filtered to eliminate the data associated with irrelevant (inconsequential) activities such as channel surfing, channel jumping, or dead period activities.

Figure 6B:
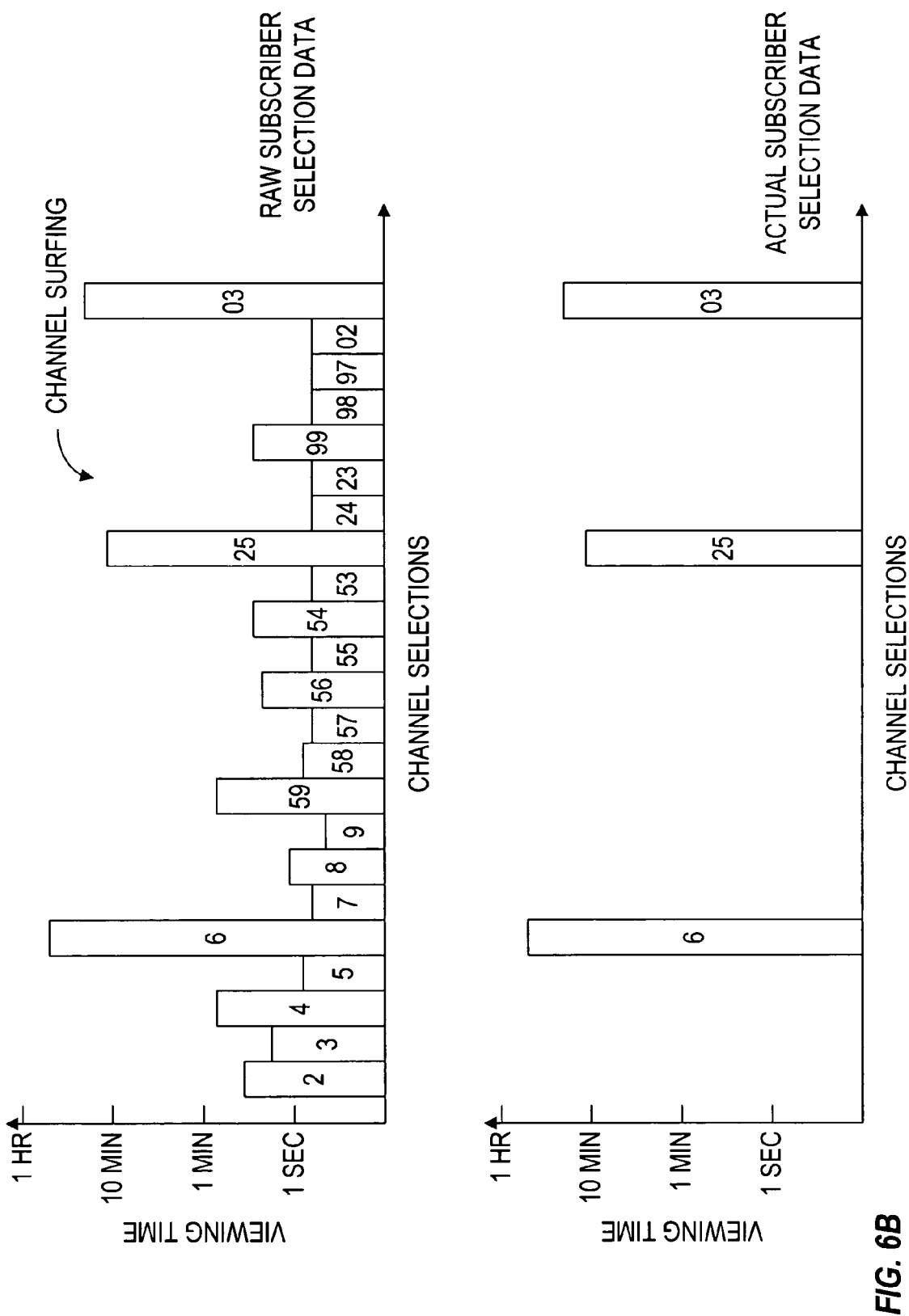
FIG. 6B illustrates the processing utilized by filters of FIG. 1A to determine channel surfing activities.

As illustrated in FIG. 6B, the channel surfing relates to an activity wherein the subscriber rapidly changes channels before arriving at a channel which may be of interest to him. During the channel surfing period, the viewing time of each intermediate channel is very brief, e.g., less than one minute. In this viewing time, the subscriber briefly glances at the channel programming, and then moves on to the next channel.

One or more filters 115 of the present invention are configured to filter out the surfing activity and only the actual viewing activity is considered in the actual make-up of household viewing habits. For example, in FIG. 6B, the viewing record illustrates that the viewing time of each of the channels 2, 3, 4, 5 is less than a minute, however, the viewing time of channel 6 is about an hour. Filter 115 of the present invention evaluates this record, and then removes the corresponding viewing times of channel 2, 3, 4, 5 from the viewing records. The viewing time of channel number 6 is kept as it is not indicative of the channel surfing, but of an actual viewing.

Similarly, the viewing record also indicates that the corresponding viewing times of each of channel numbers 7, 8, 9, 58, 57, 56, 55, 54, 53 are about minute or less, however, the viewing time of channel 25 is about 10 minutes. This implies that after the subscriber had completed the viewing of channel number 6, the subscriber once again surfed the channels to find a programming of interest at channel 25.

Filters 115 of the present invention are configured to evaluate the associated viewing times and to remove the data associated with the most of the channel surfing activities. For example, the viewing times of the channel numbers 7, 8, 9, 58, 57, 56, 55, 54, and 53 are removed, but, the viewing time associated with channel number 25 is kept. Similarly, the viewing times associated with channels 24, 23, 99, 98, 97, and 2 are eliminated (indicate channel surfing) and the viewing time of channel number 3 is kept.

Figure 6C:
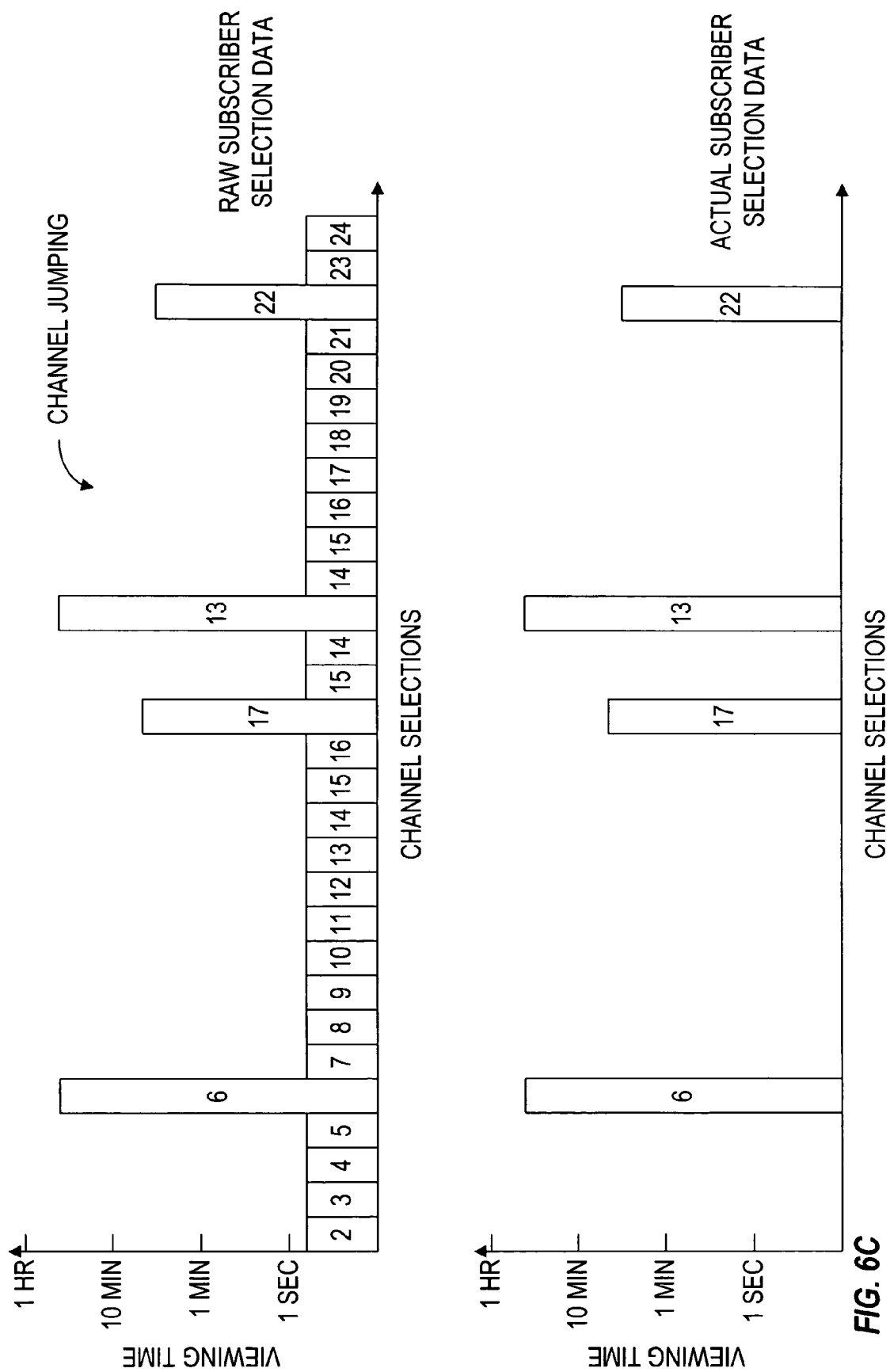
FIG. 6C illustrates the processing utilized by filters of FIG. 6C to determine channel jumping activities.

FIG. 6C illustrates processing involved in the elimination of viewing times associated with the channel jumping activities. The channel jumping activity is different than a channel surfing activity in a sense that the subscriber already knows the intended programming (and corresponding channel number) he wants to watch, and utilizes the channel up or channel down button to arrive at the intended channel.

The viewing time of all the intermediate channels during channel jumping activity are generally very brief (less than a second). Also, as the channel up or channel down button is utilized to reach the desired channels, generally, there exists an upwards or a downwards stream of channel changes, i.e., subscriber may jump through channels 2, 3, 4 and 5 to reach channel number 6 (an intended channel). Similarly, subscriber subscriber jumps may through channel 7, 8, 9, 1, 11, 12, 13, 14, 15, and 16 to reach channel 17.

Filters 115 of the present invention are configured to eliminate the channel jumping data from the actual viewing data. Filters generally evaluate the associated viewing times, and all the viewing times which correspond to channel jumping, e.g., are less than one second, are removed from the viewing records. In the exemplary case of FIG. 6C, the viewing times of channel 15, and 14 are removed, but the viewing time of channel 13 is kept. Similarly, the viewing times of channel 14, 15, 16, 17, 18, 19, 20, 21 are removed and the viewing time of channel 22 is kept.

Filters 115 are also configured to eliminate data associated with dead activities, e.g., extended spans of inactivity. These extended spans of inactivity indicate that the subscriber is not actively watching the programming, e.g., the subscriber has left the room, has gone to sleep, or is otherwise engaged in some other activity. These spans of inactivity may be determined by evaluating channel change commands, volume change commands, or other program selection commands issued by the subscriber. For example, if the evaluation of the viewing record indicates that the subscriber has not issued either of the channel change, volume change, on/off, or any other program selection command in last three hours, it is assumed that subscriber is in an inactive condition, and the remaining viewing time of that viewing session is not considered in the make-up of the household viewing habits 195. The spans of inactivity may be caused by many reasons, e.g., the subscriber has gone to sleep or has dozed off, or the subscriber is actively engaging in another activity and is not attending to the programming. Also, it is generally known that subscribers often do not turn their televisions and other multimedia sources off before attending to some other activities, e.g. cooking in the kitchen, make a run to the nearby grocery store, or going to basement for a work-out, etc.

The filters 115 of the present invention are constantly filtering out the irrelevant information associated with the channel surfing activities, channel jumping activities, or with the periods of inactivity, so that the data used for generating household viewing habits is more illustrative of the actual viewing habits. The actual subscriber selection data is then used to create household viewing habits.

A representative statistical record corresponding to the household viewing habits 195 is illustrated in FIG. 7. In a preferred embodiment, a time of day column 700 is organized in period of time including morning, mid-day, afternoon, night, and late night. In an alternate embodiment, smaller time periods are used. Column 702 lists the number of minutes watched in each period. The average number of channel changes during that period are included in column 704. The average volume is also included in column 706. The last row of the statistical record contains the totals for the items listed in the minutes watched column 702, the channel changes column 704 and the average volume 706.

Figure 8A:
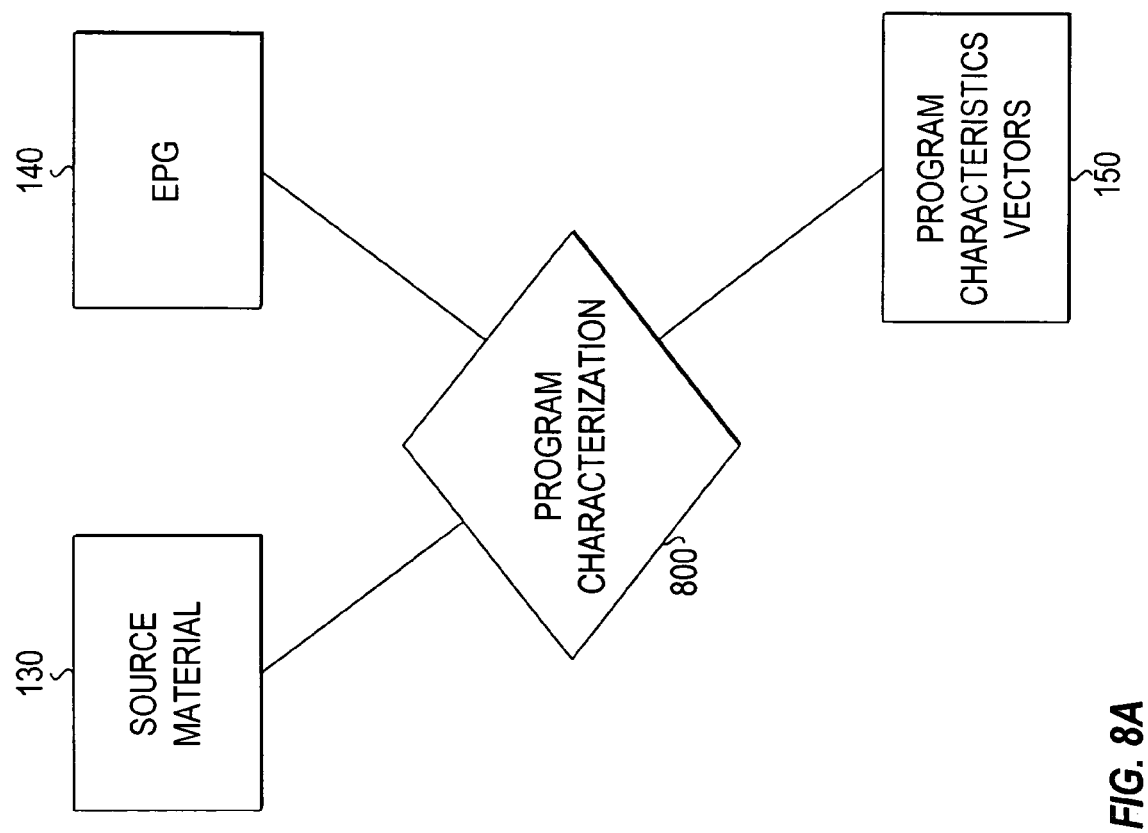
FIG. 8A illustrates an entity-relationship diagram for the generation of program characteristics vectors.

FIG. 8A illustrates an entity-relationship diagram for the generation of the program characteristics vector 150. The context vector generation and retrieval technique described in U.S. Pat. No. 5,619,709, which is incorporated herein by reference, can be applied for the generation of the program characteristics vectors 150. Other techniques are well known by those skilled in the art.

Referring to FIG. 8A, the source material 130 or the EPG 140 are passed through a program characterization process 800 to generate the program characteristics vectors 150. The program characterization process 800 is described in accordance with FIG. 8B. Program content descriptors including a first program content descriptor 802, a second program content descriptor 804 and an nth program content descriptor 806, each classified in terms of the category 144, the sub-category 146, and other divisions as identified in the industry accepted program classification system, are presented to a context vector generator 820. As an example, the program content descriptor can be text representative of the expected content of material found in the particular program category 144. In this example, the program content descriptors 802, 804 and 806 would contain text representative of what would be found in programs in the news, fiction, and advertising categories respectively. The context vector generator 820 generates context vectors for that set of sample texts resulting in a first summary context vector 808, a second summary context vector 810, and an nth summary context vector 812. In the example given, the summary context vectors 808, 810, and 812 correspond to the categories of news, fiction and advertising respectively. The summary vectors are stored in a local data storage system.

Figure 8B:
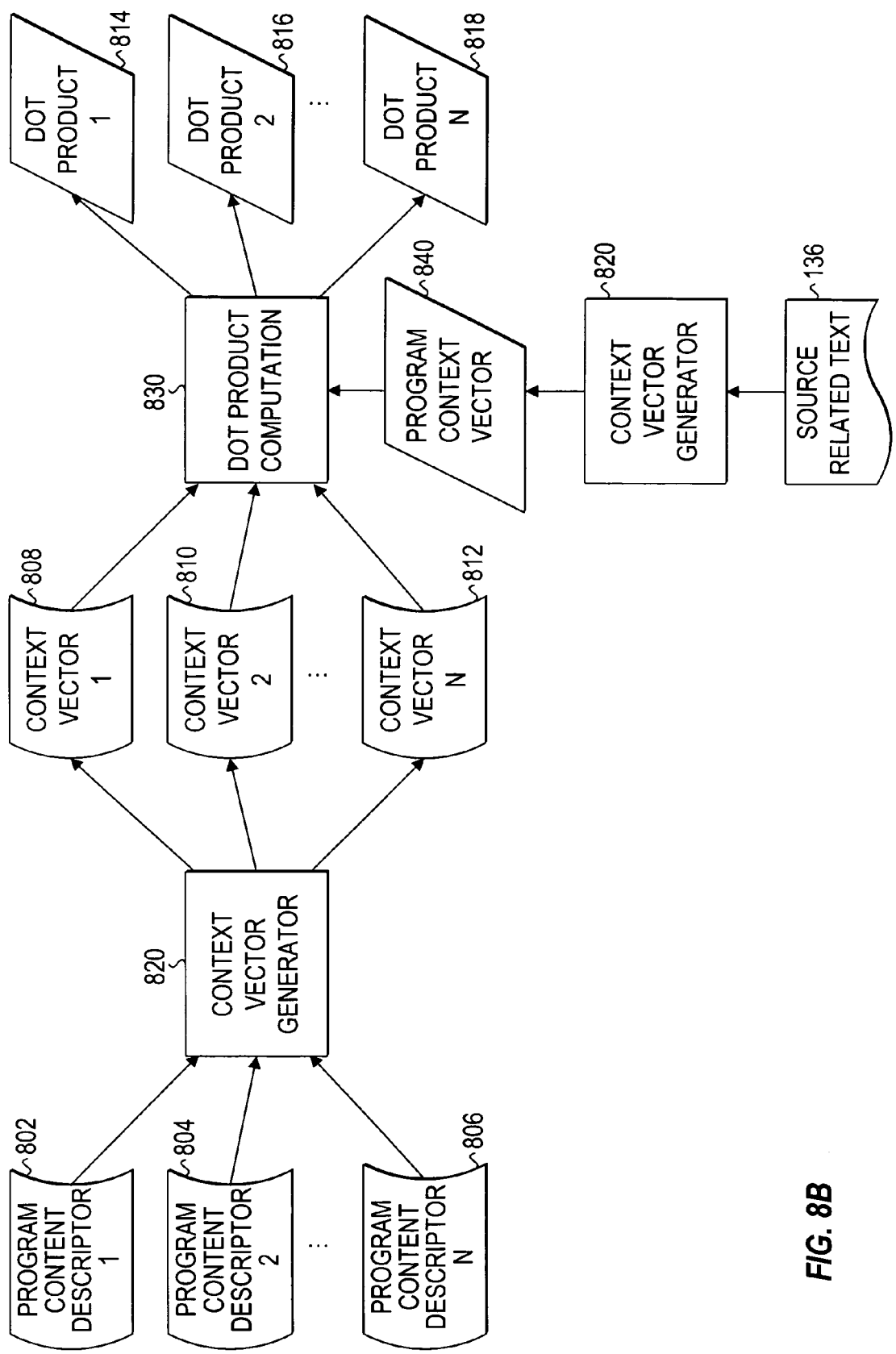
FIG. 8B illustrates a flowchart for program characterization.

Referring to FIG. 8B, a sample of the source related text 136 which is associated with the new program to be classified is passed to the context vector generator 820 which generates a program context vector 840 for that program. The source related text 136 can be either the source material 130, the EPG 140, or other text associated with the source material. A comparison is made between the actual program context vectors and the stored program content context vectors by computing, in a dot product computation process 830, the dot product of the first summary context vector 808 with the program context vector 840 to produce a first dot product 814. Similar operations are performed to produce second dot product 816 and nth dot product 818.

The values contained in the dot products 814, 816 and 818, while not probabilistic in nature, can be expressed in probabilistic terms using a simple transformation in which the result represents a confidence level of assigning the corresponding content to that program. The transformed values add up to one. The dot products can be used to classify a program, or form a weighted sum of classifications which results in the program characteristics vectors 150. In the example given, if the source related text 136 was from an advertisement, the nth dot product 818 would have a high value, indicating that the advertising category was the most appropriate category, and assigning a high probability value to that category. If the dot products corresponding to the other categories were significantly higher than zero, those categories would be assigned a value, with the result being the program characteristics vectors 150 as shown in FIG. 9D.

For the sub-categories, probabilities obtained from the content pertaining to the same sub-category 146 are summed to form the probability for the new program being in that sub-category 146. At the sub-category level, the same method is applied to compute the probability of a program being from the given category 144. The three levels of the program classification system; the category 144, the sub-category 146 and the content, are used by the program characterization process 800 to form the program characteristics vectors 150 which are depicted in FIGS. 9D-9F.

Figure 9A:
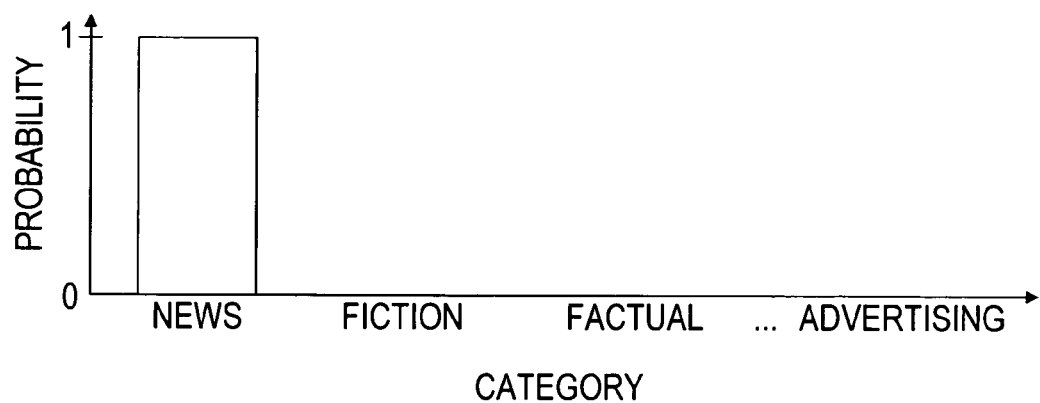
FIG. 9A illustrates a deterministic program category vector.
Figure 9B:
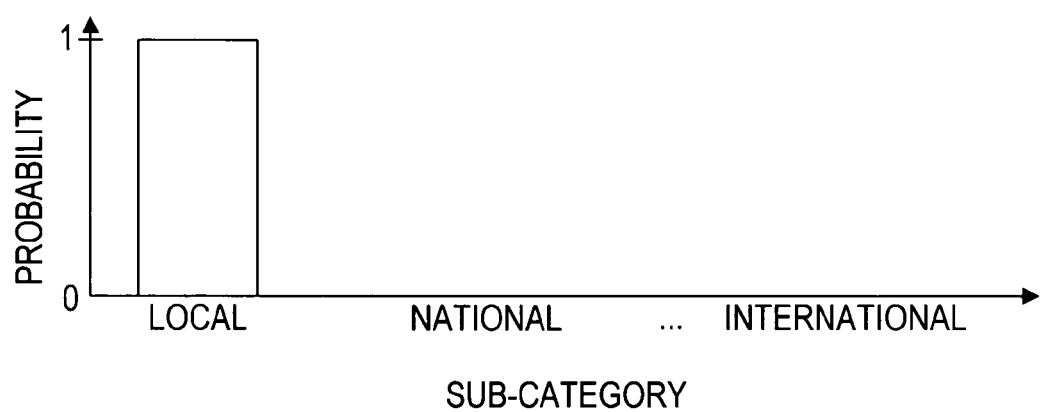
FIG. 9B illustrates a deterministic program sub-category vector.
Figure 9C:
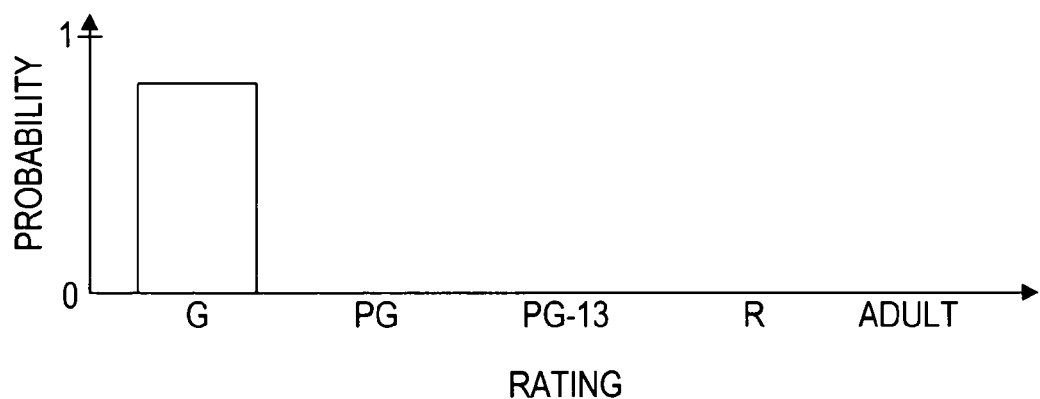
FIG. 9C illustrates a deterministic program rating vector.
Figure 9D:
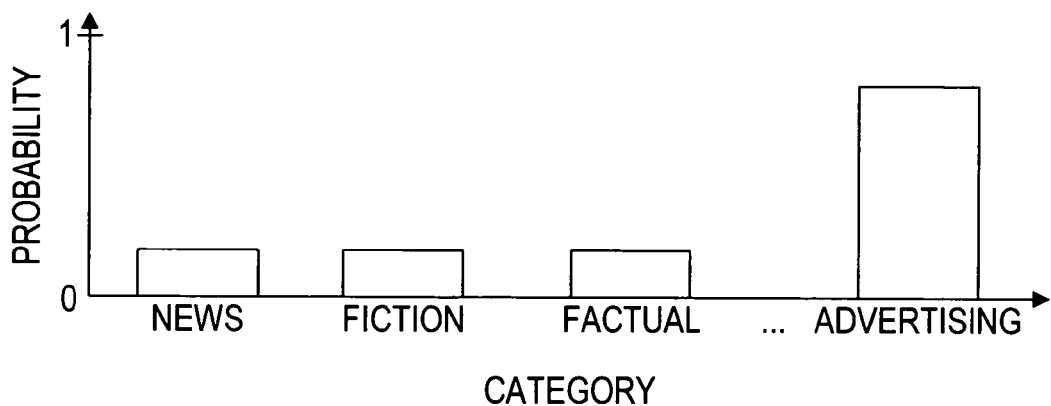
FIG. 9D illustrates a probabilistic program category vector.
Figure 9E:
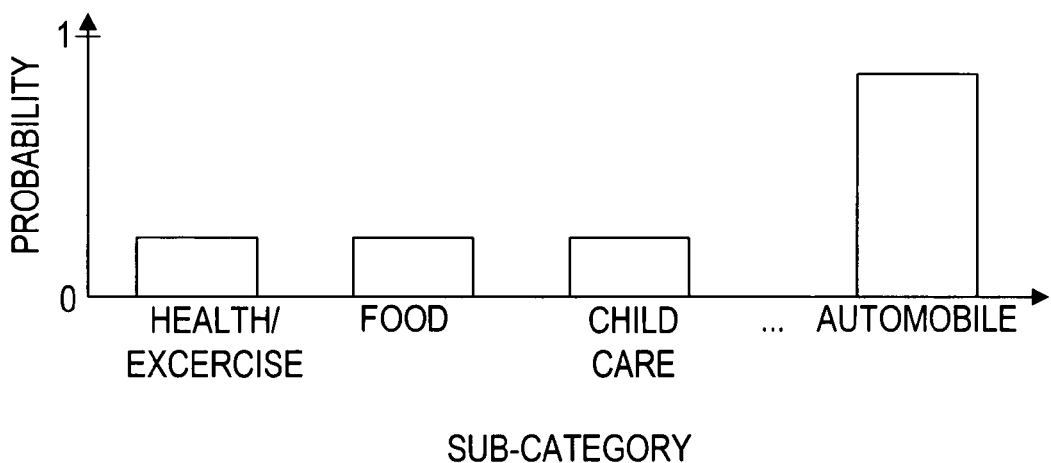
FIG. 9E illustrates a probabilistic program sub-category vector.
Figure 9F:
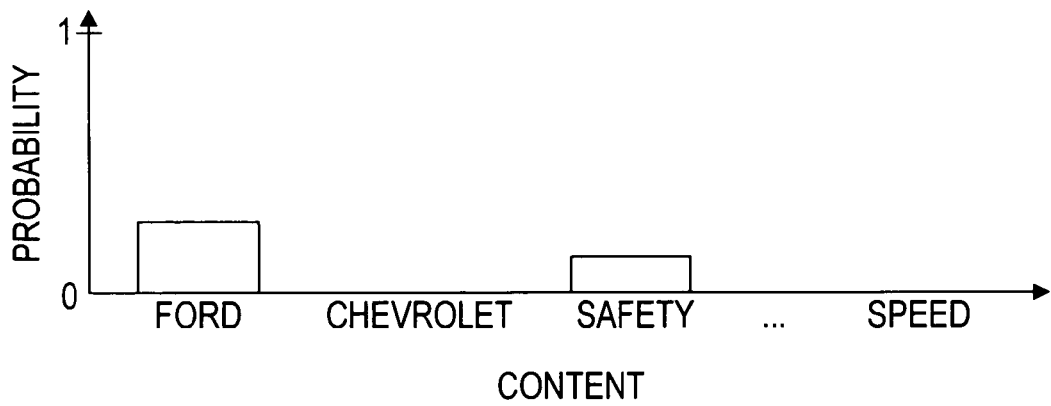
FIG. 9F illustrates a probabilistic program content vector.

The program characteristics vectors 150 in general are represented in FIGS. 9A through 9F. FIGS. 9A, 9B and 9C are an example of deterministic program vectors. This set of vectors is generated when the program characteristics are well defined, as can occur when the source related text 136 or the EPG 140 contains specific fields identifying the category 144 and the sub-category 146. A program rating can also provided by the EPG 140.

In the case that these characteristics are not specified, a statistical set of vectors is generated from the process described in accordance with FIG. 8. FIG. 9D shows the probability that a program being watched is from the given category 144. The categories are listed in the X-axis. The sub-category 146 is also expressed in terms of probability. This is shown in FIG. 9E. The content component of this set of vectors is a third possible level of the program classification, and is illustrated in FIG. 9F.

Figure 10A:
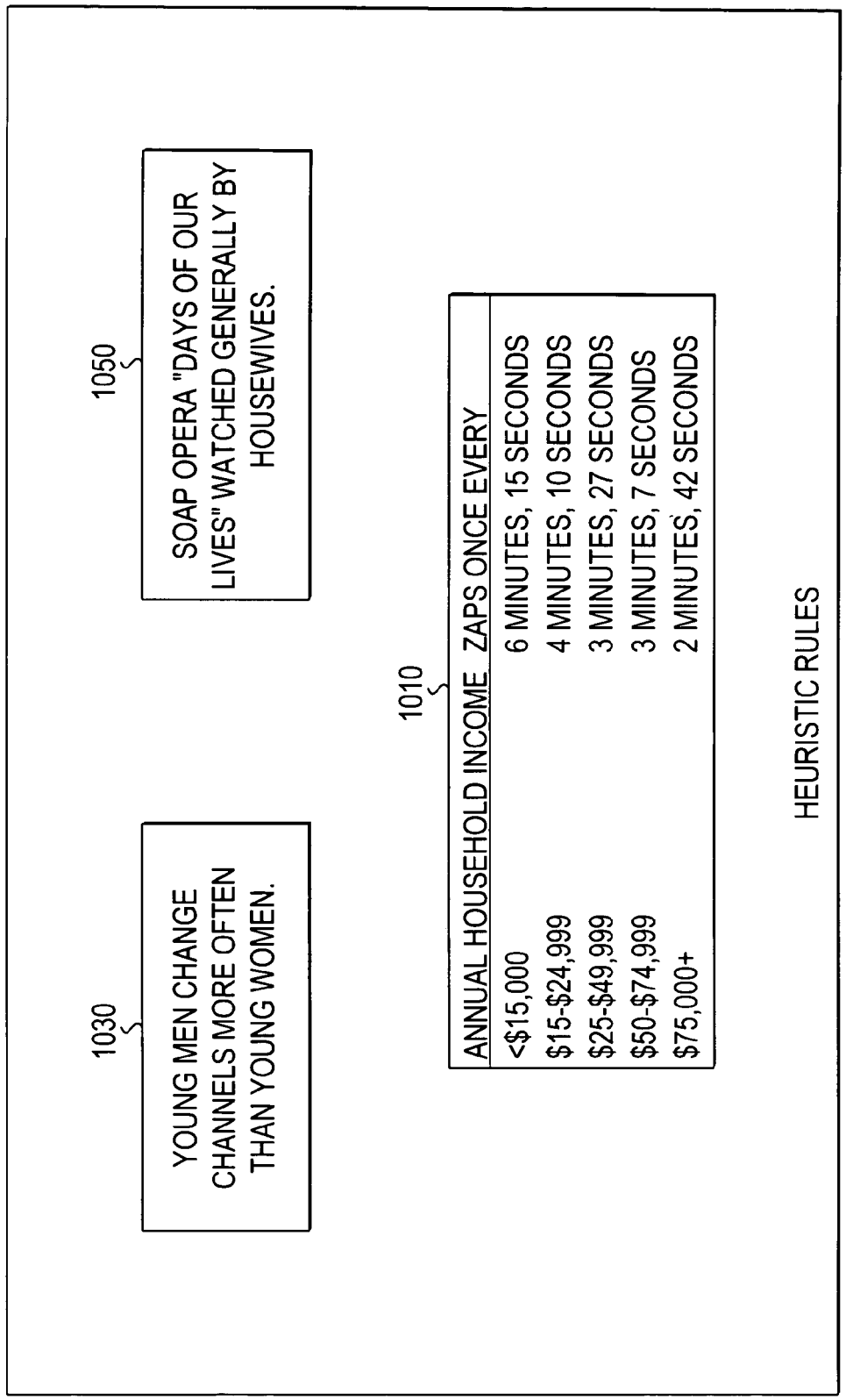
FIG. 10A illustrates a set of logical heuristic rules.

FIG. 10A illustrates sets of logical heuristics rules which form part of the heuristic rules 160. In a preferred embodiment, logical heuristic rules are obtained from sociological or psychological studies. Two types of rules are illustrated in FIG. 10A. The first type links an individual's viewing characteristics to demographic characteristics such as gender, age, and income level. A channel changing rate rule 1030 attempts to determine gender based on channel change rate. An income related channel change rate rule 1010 attempts to link channel change rates to income brackets. A second type of rules links particular programs to particular audience, as illustrated by a gender determining rule 1050 which links the program category 144/sub-category 146 with a gender. The result of the application of the logical heuristic rules illustrated in FIG. 10A are probabilistic determinations of factors including gender, age, and income level. Although a specific set of logical heuristic rules has been used as an example, a wide number of types of logical heuristic rules can be used to realize the present invention. In addition, these rules can be changed based on learning within the system or based on external studies which provide more accurate rules.

FIG. 10B illustrates a set of the heuristic rules 160 expressed in terms of conditional probabilities. In the example shown in FIG. 10B, the category 144 has associated with it conditional probabilities for demographic factors such as age, income, family size and gender composition. The category 144 has associated with it conditional probabilities that represent probability that the viewing group is within a certain age group dependent on the probability that they are viewing a program in that category 144.

Figure 11:
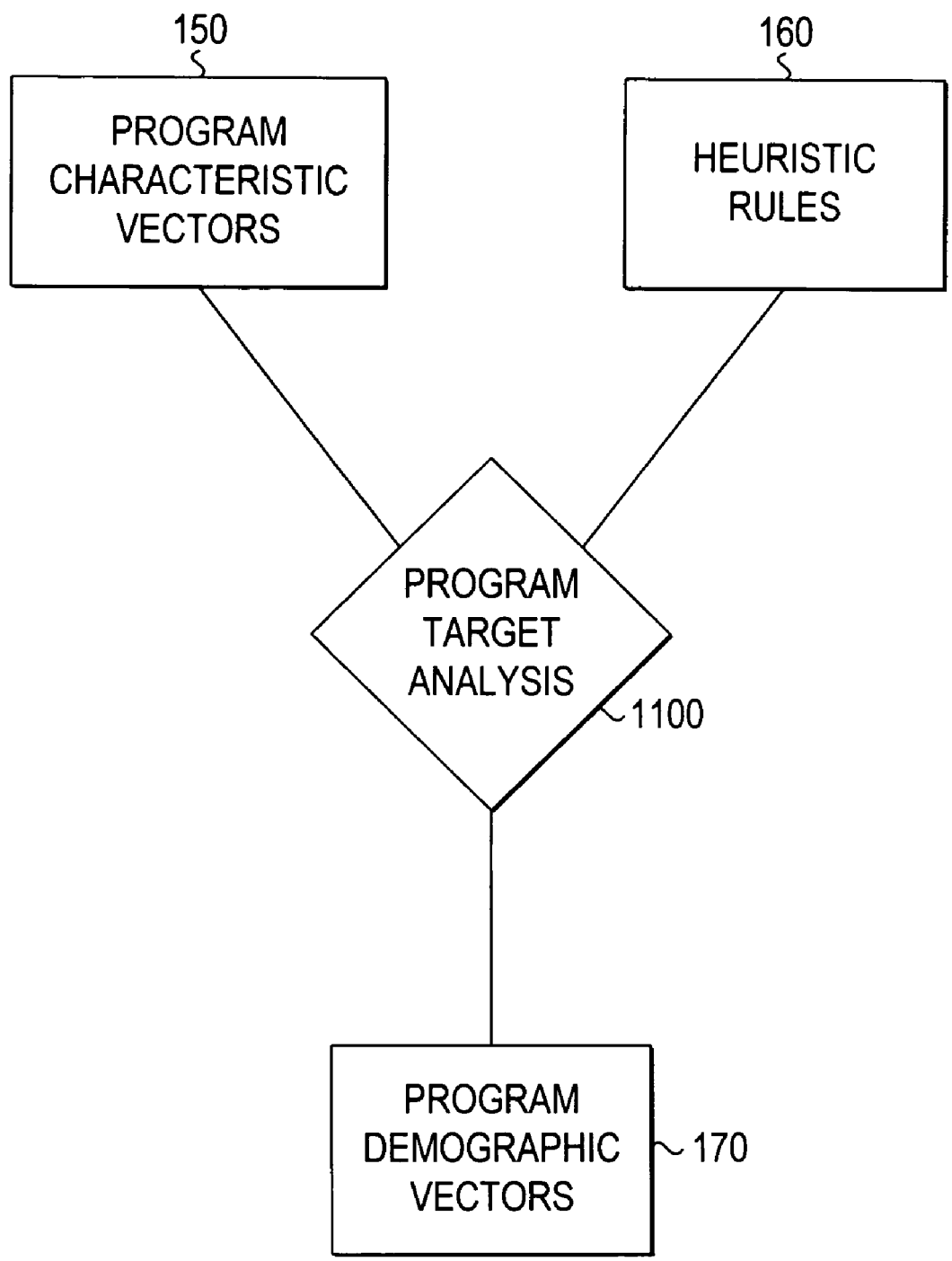
FIG. 11 illustrates an entity-relationship diagram for the generation of program demographic vectors.

FIG. 11 illustrates an entity-relationship diagram for the generation of the program demographic vectors 170. In a preferred embodiment, the heuristic rules 160 are applied along with the program characteristic vectors 150 in a program target analysis process 1100 to form the program demographic vectors 170. The program characteristic vectors 150 indicate a particular aspect of a program, such as its violence level. The heuristic rules 160 indicate that a particular demographic group has a preference for that program. As an example, it may be the case that young males have a higher preference for violent programs than other sectors of the population. Thus, a program which has the program characteristic vectors 150 indicating a high probability of having violent content, when combined with the heuristic rules 160 indicating that "young males like violent programs," will result, through the program target analysis process 1100, in the program demographic vectors 170 which indicate that there is a high probability that the program is being watched by a young male.

Figure 12:
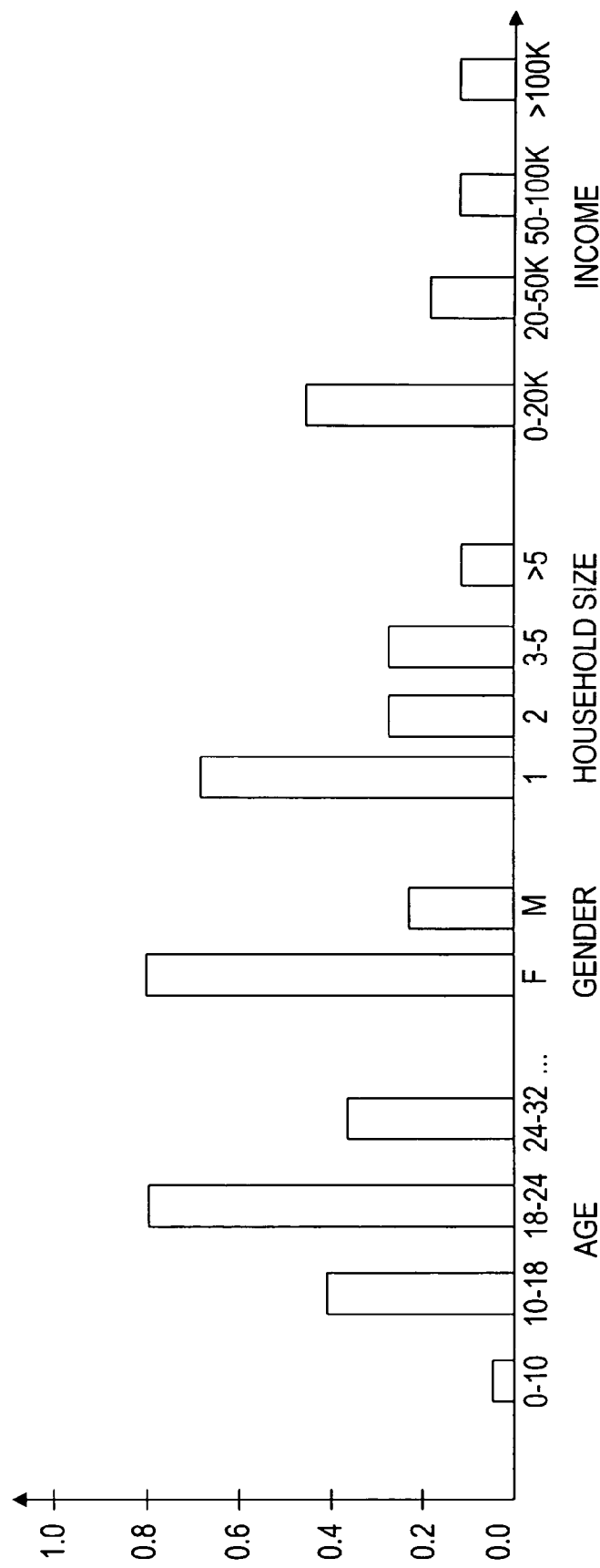
FIG. 12 illustrates a program demographic vector.

The program target analysis process 1100 can be realized using software programmed in a variety of languages which processes mathematically the heuristic rules 160 to derive the program demographic vectors 170. The table representation of the heuristic rules 160 illustrated in FIG. 10B expresses the probability that the individual or household is from a specific demographic group based on a program with a particular category 144. This can be expressed, using probability terms as follow "the probability that the individuals are in a given demographic group conditional to the program being in a given category". Referring to FIG. 12, the probability that the group has certain demographic characteristics based on the program being in a specific category is illustrated.

Expressing the probability that a program is destined to a specific demographic group can be determined by applying Bayes rule. This probability is the sum of the conditional probabilities that the demographic group likes the program, conditional to the category 144 weighted by the probability that the program is from that category 144. In a preferred embodiment, the program target analysis can calculate the program demographic vectors by application of logical heuristic rules, as illustrated in FIG. 10A, and by application of heuristic rules expressed as conditional probabilities as shown in FIG. 10B. Logical heuristic rules can be applied using logical programming and fuzzy logic using techniques well understood by those skilled in the art, and are discussed in the text by S. V. Kartalopoulos entitled "Understanding Neural Networks and Fuzzy Logic" which is incorporated herein by reference.

Conditional probabilities can be applied by simple mathematical operations multiplying program context vectors by matrices of conditional probabilities. By performing this process over all the demographic groups, the program target analysis process 1100 can measure how likely a program is to be of interest to each demographic group. Those probabilities values form the program demographic vector 170 represented in FIG. 12.

As an example, the heuristic rules expressed as conditional probabilities shown in FIG. 10B are used as part of a matrix multiplication in which the program characteristics vector 150 of dimension N, such as those shown in FIGS. 9A-9F is multiplied by an N×M matrix of heuristic rules expressed as conditional probabilities, such as that shown in FIG. 10B. The resulting vector of dimension M is a weighted average of the conditional probabilities for each category and represents the household demographic characteristics 190. Similar processing can be performed at the sub-category and content levels.

FIG. 12 illustrates an example of the program demographic vector 170, and shows the extent to which a particular program is destined to a particular audience. This is measured in terms of probability as depicted in FIG. 12. The Y-axis is the probability of appealing to the demographic group identified on the X-axis.

Figure 13:
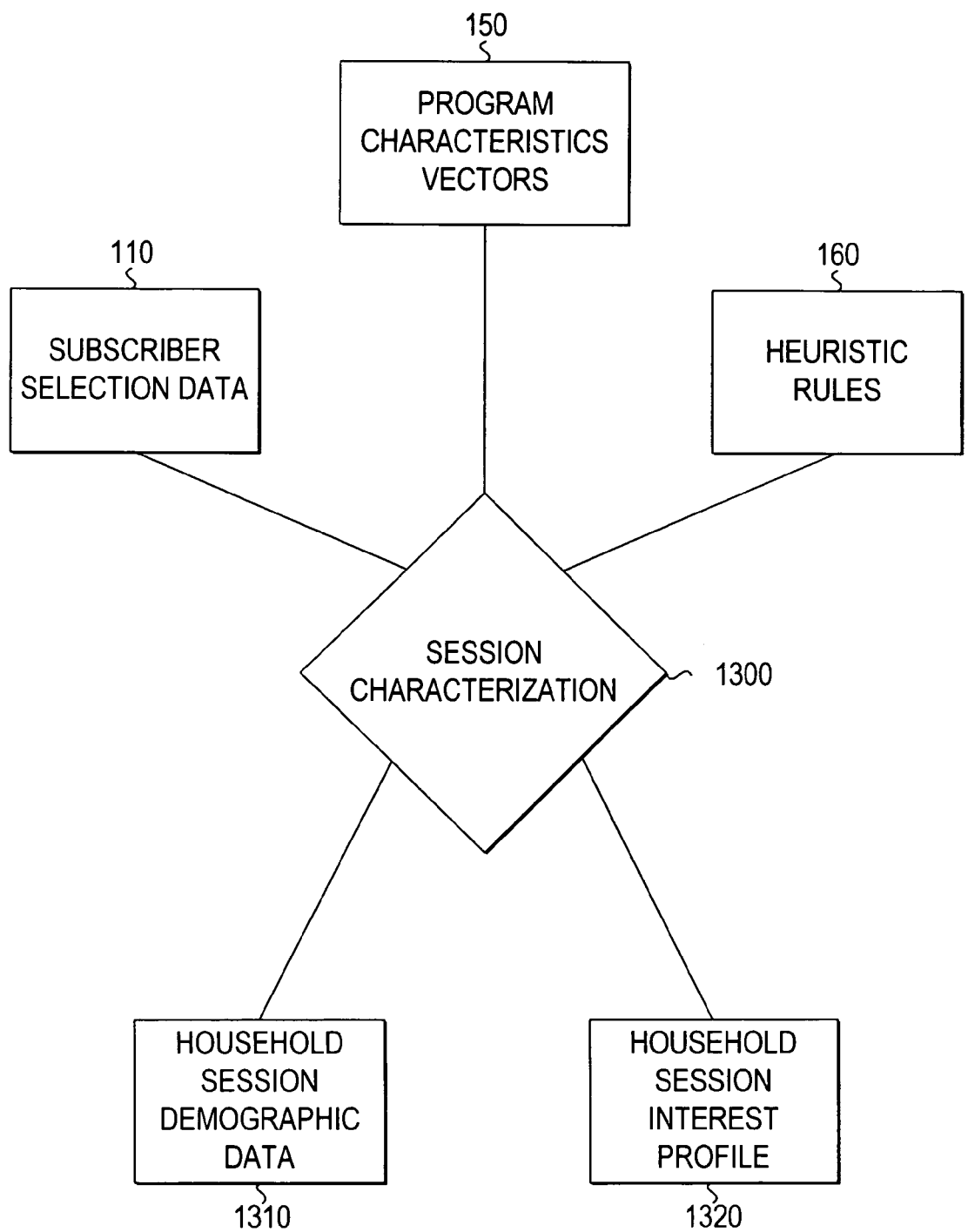
FIG. 13 illustrates an entity-relationship diagram for the generation of household session demographic data and household session interest profiles.

FIG. 13 illustrates an entity-relationship diagram for the generation of household session demographic data 1310 and household session interest profile 1320. In a preferred embodiment, the actual subscriber selection data 199 is used along with the program characteristics vectors 150 in a session characterization process 1300 to generate the household session interest profile 1320. The subscriber selection data 110 indicates what the subscriber is watching, for how long and at what volume they are watching the program.

In a preferred embodiment, the session characterization process 1300 forms a weighted average of the program characteristics vectors 150 in which the time duration the program is watched is normalized to the session time (typically defined as the time from which the unit was turned on to the present). The program characteristics vectors 150 are multiplied by the normalized time duration (which is less than one unless only one program has been viewed) and summed with the previous value. Time duration data, along with other subscriber viewing information, is available from the subscriber selection data 110. The resulting weighted average of program characteristics vectors forms the household session interest profile 1320, with each program contributing to the household session interest profile 1320 according to how long it was watched. The household session interest profile 1320 is normalized to produce probabilistic values of the household programming interests during that session.

In an alternate embodiment, the heuristic rules 160 are applied to both the actual subscriber selection data 199 and the program characteristics vectors 150 to generate the household session demographic data 1310 and the household session interest profile 1320. In this embodiment, weighted averages of the program characteristics vectors 150 are formed based on the actual subscriber selection data 199, and the heuristic rules 160 are applied. In the case of logical heuristic rules as shown in FIG. 10A, logical programming can be applied to make determinations regarding the household session demographic data 1310 and the household session interest profile 1320. In the case of heuristic rules in the form of conditional probabilities such as those illustrated in FIG. 10B, a dot product of the time averaged values of the program characteristics vectors can be taken with the appropriate matrix of heuristic rules to generate both the household session demographic data 1310 and the household session interest profile 1320.

Volume control measurements which form part of the actual subscriber selection data 199 can also be applied in the session characterization process 1300 to form a household session interest profile 1320. This can be accomplished by using normalized volume measurements in a weighted average manner similar to how time duration is used. Thus, muting a show results in a zero value for volume, and the program characteristics vector 150 for this show will not be averaged into the household session interest profile 1320.

Figure 14:
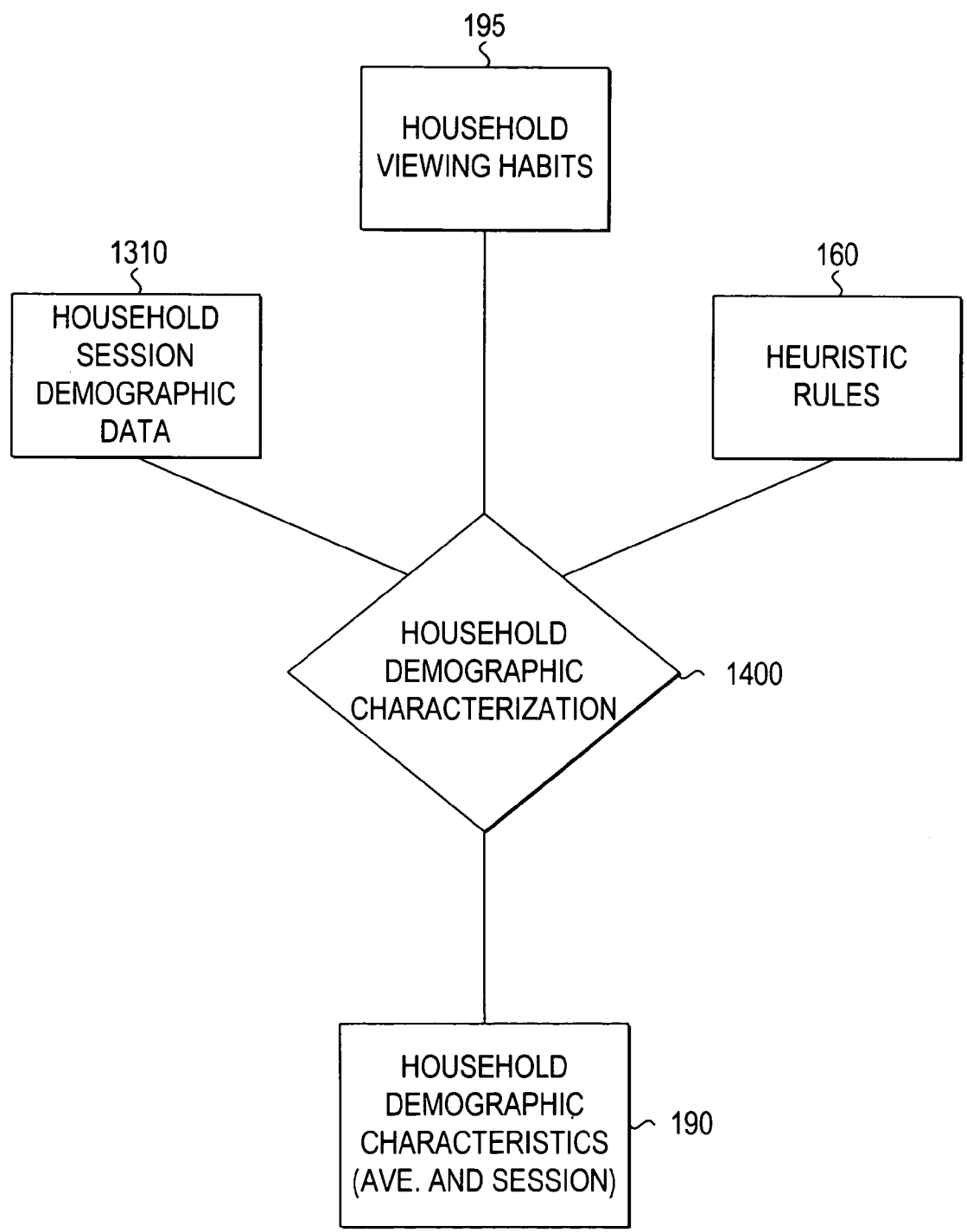
FIG. 14 illustrates an entity-relationship diagram for the generation of average and session household demographic characteristics.

FIG. 14 illustrates an entity-relationship diagram for the generation of average household demographic characteristics and session household demographic characteristics 190. A household demographic characterization process 1400 generates the household demographic characteristics 190 represented in table format in FIG. 15. The household demographic characterization process 1400 uses the household viewing habits 195 in combination with the heuristic rules 160 to determine demographic data. For example, a household with a number of minutes watched of zero during the day may indicate a household with two working adults. Both logical heuristic rules as well as rules based on conditional probabilities can be applied to the household viewing habits 195 to obtain the household demographics characteristics 190.

The household viewing habits 195 is also used by the system to detect out-of-habits events. For example, if a household with a zero value for the minutes watched column 702 at late night presents a session value at that time via the household session demographic data 1310, this session will be characterized as an out-of-habits event and the system can exclude such data from the average if it is highly probable that the demographics for that session are greatly different than the average demographics for the household. Nevertheless, the results of the application of the household demographic characterization process 1400 to the household session demographic data 1310 can result in valuable session demographic data, even if such data is not added to the average demographic characterization of the household.

FIG. 15 illustrates the average and session household demographic characteristics. A household demographic parameters column 1501 is followed by an average value column 1505, a session value column 1503, and an update column 1507. The average value column 1505 and the session value column 1503 are derived from the household demographic characterization process 1400. The deterministic parameters such as address and telephone numbers can be obtained from an outside source or can be loaded into the system by the subscriber or a network operator at the time of installation. Updating of deterministic values is prevented by indicating that these values should not be updated in the update column 1507.

Figure 16:
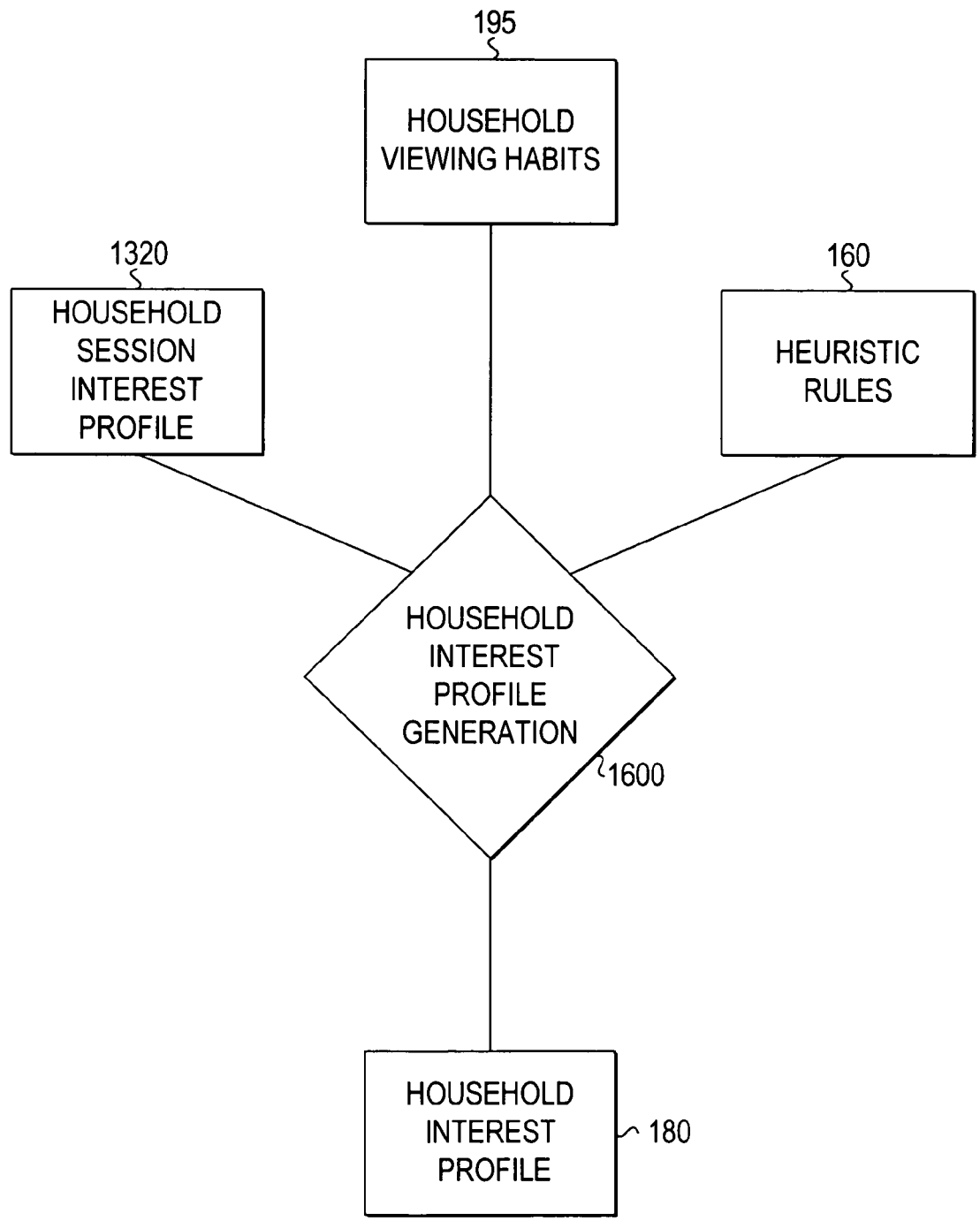
FIG. 16 illustrates an entity-relationship diagram for generation of a household interest profile.

FIG. 16 illustrates an entity-relationship diagram for the generation of the household interest profile 180 in a household interest profile generation process 1600. In a preferred embodiment, the household interest profile generation process comprises averaging the household session interest profile 1320 over multiple sessions and applying the household viewing habits 195 in combination with the heuristic rules 160 to form the household interest profile 180 which takes into account both the viewing preferences of the household as well as assumptions about households/subscribers with those viewing habits and program preferences.

FIG. 17 illustrates the household interest profile 180 which is composed of a programming types row 1709, a products types row 1707, and a household interests column 1701, an average value column 1703, and a session value column 1705.

The product types row 1707 gives an indication as to what type of advertisement the household would be interested in watching, thus indicating what types of products could potentially be advertised with a high probability of the advertisement being watched in its entirety. The programming types row 1709 suggests what kind of programming the household is likely to be interested in watching. The household interests column 1701 specifies the types of programming and products which are statistically characterized for that household.

As an example of the industrial applicability of the invention, a household will perform its normal viewing routine without being requested to answer specific questions regarding likes and dislikes. Children may watch television in the morning in the household, and may change channels during commercials, or not at all. The television may remain off during the working day, while the children are at school and day care, and be turned on again in the evening, at which time the parents may "surf" channels, mute the television during commercials, and ultimately watch one or two hours of broadcast programming. The present invention provides the ability to characterize the household based on actual viewing selections, e.g., channel surfing, channel jumping or dead periods are not considered. Based on the actual subscriber selection data, the determinations are made that there are children and adults in the household, and program and product interests indicated in the household interest profile 180 corresponds to a family of that composition. For example, a household with two retired adults will have a completely different characterization which will be indicated in the household interest profile 180.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. In a video network, a computer-implemented method of determining the number of people in a household, the method comprising:
   (a) monitoring viewer interactions with a multimedia device;
   (b) processing the viewer interactions to obtain viewer interaction data corresponding to the viewer interactions;
   (c) retrieving one or more previously developed heuristic rules, wherein the previously developed heuristic rules relate at least one aspect of the viewer interaction data to the number of people in the household and wherein the previously developed heuristic rules have been previously developed through the application of at least one heuristic process;
   (d) applying one or more of the previously developed heuristic rules to at least a subset of the viewer interaction data; and
   (e) inferring the number of people in the household from the viewer interaction data based on the application of the previously developed heuristic rules.

2. The method of claim 1, wherein the heuristic rules are probabilistic in nature.

3. The method of claim 1, wherein the inferred number of people in the household is expressed as a probability assigned by the heuristic rules based on the viewer interaction data.

4. The method of claim 1, wherein said monitoring includes monitoring at least some subset of channel changes, volume changes, record commands, and time of viewer interaction.

5. The method of claim 1, wherein step (b) includes evaluating channel change commands and associated viewing times to determine the viewer interaction data.

6. The method of claim 1, wherein the viewer interaction data includes at least some subset of
   viewing time per channel, category, and network;
   channel changes per time period;
   average volume per time period, channel, category, and network; and
   dwell time per channel, category, and network.

7. The method of claim 1, wherein the heuristic rules are predefined.

8. The method of claim 1, wherein the heuristic rules remain unchanged at least during steps (c), (d) and (e).

9. The method of claim 1, wherein the heuristic rules create an inferential link between the viewer interaction data and the number of people in the household.

10. The method of claim 1, wherein the application of the heuristic rules provides a predictive value that the household has the number of people inferred in step (e).

11. The method of claim 1, further comprising:
    (f) accessing the inferred number of people in the household, wherein the accessing includes predictive values of the inferred number of people in the household and at least one other number of people in the household, and wherein the predictive values are assigned by the heuristic rules based on the viewer interaction data.

12. In a video network, a computer-implemented method of determining the number of people in a household, the method comprising:
    (a) monitoring viewer interactions with a multimedia device, the viewer interactions occurring during one or more interaction sessions;
    (b) processing the viewer interactions to obtain viewer interaction data;
    (c) retrieving one or more previously developed heuristic rules, wherein the previously developed heuristic rules relate at least one aspect of the viewer interaction data to the number of people in the household and wherein the previously developed heuristic rules have been previously developed through the application of at least one heuristic process;
    (d) applying one or more of the previously developed heuristic rules to at least a subset of the viewer interaction data, for each interaction session; and
    (e) inferring the number of people in the household from the viewer interaction data for each interaction session based on the application of the previously developed heuristic rules.

13. The method of claim 12, wherein said step (b) includes processing the viewer interactions for an interaction session to generate session interaction data for each interaction session.

14. The method of claim 12, wherein step (b) includes processing the viewer interactions for multiple interaction sessions to generate average interaction data for the multiple interaction sessions.

15. The method of claim 14, wherein the heuristic rules are applied to the average interaction data.

16. The method of claim 12, wherein the heuristic rules are probabilistic in nature.

17. The method of claim 12, wherein the inferred number of people in the household is expressed as a probability assigned by the heuristic rules based on the viewer interaction data.

18. The method of claim 12, wherein said monitoring includes monitoring at least some subset of channel changes, volume changes, record commands, and time of viewer interaction.

19. The method of claim 12, wherein step (b) includes evaluating channel change commands and associated viewing times to group the viewer interaction data.

20. The method of claim 12, wherein the viewer interaction data includes at least some subset of
    viewing time per channel, category, and network;
    channel changes per time period;
    average volume per time period, channel, category, and network; and
    dwell time per channel, category, and network.

21. The method of claim 12, wherein the heuristic rules are predefined.

22. The method of claim 12, wherein the heuristic rules remain unchanged at least during steps (c), (d) and (e).

23. The method of claim 12, wherein the heuristic rules create an inferential link between the viewer interaction data and the number of people in the household.

24. The method of claim 12, wherein the application of the heuristic rules provides a predictive value that the household has the number of people inferred in step (e).

25. The method of claim 12, further comprising:
    (f) accessing the inferred number of people in the household, wherein the accessing includes predictive values of the inferred number of people in the household and at least one other number of people in the household, and wherein the predictive values are assigned by the heuristic rules based on the viewer interaction data.

26. In a video network, a computer-implemented method of determining the number of people in a household, the method comprising:
    (a) monitoring viewer interactions with a multimedia device, the viewer interactions occurring during one or more viewing periods;

(b) processing the viewer interactions to obtain viewer interaction data;
(c) retrieving one or more previously developed heuristic rules, wherein the previously developed heuristic rules relate at least one aspect of the viewer interaction data to the number of people in the household and wherein the previously developed heuristic rules have been previously developed through the application of at least one heuristic process;
(d) applying one or more of the previously developed heuristic rules to the viewer interaction data for each viewing period; and
(e) inferring the number of people in the household from the viewer interaction data based on the application of the previously developed heuristic rules.

27. The method of claim 26, wherein said step (b) includes processing the viewer interactions for a viewing period to generate period interaction data for each viewing period.

28. The method of claim 26, wherein step (b) includes processing the viewer interactions for multiple viewing periods to generate average interaction data for the multiple viewing periods.

29. The method of claim 28, wherein the heuristic rules are applied to the average interaction data.

30. The method of claim 26, wherein the heuristic rules are probabilistic in nature.

31. The method of claim 26, wherein the inferred number of people in the household is expressed as a probability assigned by the heuristic rules based on the viewer interaction data.

32. The method of claim 26, wherein said monitoring includes monitoring at least some subset of channel changes, volume changes, record commands, and time of viewer interaction.

33. The method of claim 26, wherein step (b) includes evaluating channel change commands and associated viewing times to group the viewer interaction data.

34. The method of claim 26, wherein the viewer interaction data includes at least some subset of
viewing time per channel, category, and network;
channel changes per time period;
average volume per time period, channel, category, and network; and
dwell time per channel, category, and network.

35. The method of claim 26, wherein the heuristic rules are predefined.

36. The method of claim 26, wherein the heuristic rules remain unchanged at least during steps (c), (d) and (e).

37. The method of claim 26, wherein the heuristic rules create an inferential link between the viewer interaction data and the number of people in the household.

38. The method of claim 26, wherein the application of the heuristic rules provides a predictive value that the household has the number of people inferred in step (e).

39. The method of claim 26, further comprising:
(f) accessing the inferred number of people in the household, wherein the accessing includes predictive values of the inferred number of people in the household and at least one other number of people in the household, and wherein the predictive values are assigned by the heuristic rules based on the viewer interaction data.

* * * * *